(12) United States Patent
Johnson

(10) Patent No.: US 7,725,405 B2
(45) Date of Patent: May 25, 2010

(54) SYSTEM AND METHOD FOR AGENCY BASED POSTING AND SEARCHING FOR JOB OPENINGS VIA A COMPUTER SYSTEM AND NETWORK

(75) Inventor: Richard S. Johnson, Wilson, WY (US)

(73) Assignee: Yahoo! Inc., Sunnyvale, CA (US)

( * ) Notice: Subject to any disclaimer, the term of this patent is extended or adjusted under 35 U.S.C. 154(b) by 1165 days.

(21) Appl. No.: 10/011,962

(22) Filed: Nov. 5, 2001

(65) Prior Publication Data

US 2002/0133369 A1 Sep. 19, 2002

Related U.S. Application Data

(60) Provisional application No. 60/245,739, filed on Nov. 3, 2000.

(51) Int. Cl.
 G06Q 10/00 (2006.01)
 G06Q 30/00 (2006.01)
(52) U.S. Cl. .................. 705/321; 705/1.1; 705/320; 705/319
(58) Field of Classification Search .............. 705/1
 See application file for complete search history.

(56) References Cited

U.S. PATENT DOCUMENTS

| | | | |
|---|---|---|---|
| 5,164,897 A * | 11/1992 | Clark et al. ............. | 705/1 |
| 5,197,004 A | 3/1993 | Sobotka et al. | |
| 5,197,005 A | 3/1993 | Shwartz et al. | |
| 5,283,731 A | 2/1994 | Lalonde et al. | |
| 5,299,123 A | 3/1994 | Wang et al. | |
| 5,355,474 A | 10/1994 | Thuraisngham et al. | |
| 5,416,694 A | 5/1995 | Parrish et al. | |
| 5,495,412 A | 2/1996 | Thiessen | |
| 5,506,984 A | 4/1996 | Miller | |
| H1589 H | 9/1996 | Rosenthal | |
| 5,754,939 A | 5/1998 | Herz et al. | |
| 5,758,324 A | 5/1998 | Hartman et al. | |
| 5,778,367 A | 7/1998 | Wesinger, Jr. et al. | |
| 5,832,497 A * | 11/1998 | Taylor ..................... | 707/104.1 |

(Continued)

OTHER PUBLICATIONS www.softshoe.com retreived from www.archive.org; anylinkage May 24, 1998.*

(Continued)

*Primary Examiner*—John G Weiss
*Assistant Examiner*—Candice D Carter
(74) *Attorney, Agent, or Firm*—Greenberg Traurig, LLP

(57) ABSTRACT

System and Method For Agency Based Posting and Searching For Job Openings Via a Computer System and Network for use by placement agents who normally would not have access to files in a career bulletin board. The system gives placement agents the opportunity to interact directly with corporate recruiters who are members of the system. Communication between the placement agent and the corporate member is permitted only if so designated by the corporate member. Utilities for the corporate member allow jobs to be defined, stored, and conveyed to preferred placement agents. Utilities for placement agents permit candidates to be registered, candidate profiles to be created, and sent to the corporate member who is the client of the placement agent.

12 Claims, 15 Drawing Sheets

U.S. PATENT DOCUMENTS

| | | | | |
|---|---|---|---|---|
| 5,978,768 A | * | 11/1999 | McGovern et al. | 705/1 |
| 6,324,538 B1 | | 11/2001 | Wesinger, Jr. et al. | |
| 6,370,510 B1 | * | 4/2002 | McGovern et al. | 705/1 |
| 6,385,620 B1 | * | 5/2002 | Kurzius et al. | 707/104.1 |
| 6,466,914 B2 | * | 10/2002 | Mitsuoka et al. | 705/9 |
| 6,892,178 B1 | * | 5/2005 | Zacharia | 705/10 |
| 2002/0026452 A1 | * | 2/2002 | Baumgarten et al. | 707/104.1 |

OTHER PUBLICATIONS

Proquest article "The Directory of Executive Recruiters 1999."; Computerworld; Earls, Alan; Jun. 21, 1999. vol. 22 Iss. 25 p. 56.*

"Monsters Jobs On The Web" Prodigy. Web Browser (http://www0.monster.com:81/home.html).

"Monsters Jobs On The Web" (http://www0.monster.com:81/home.html).

* cited by examiner fig. 9

AP Search Page

Jobs 1010 | Candidates | MyVendors 1014 | Search 1016 | Help 1018

Search Resumes 1020 | Search Agents 1022 | Search Recruiting Agencies 1024

1026:
- Keyword
- Agency Name
- Industry: Advertising
- Interest: Ad Sales
- Country
- City
- State 1028:
- Agent Last Name | Agent First Name
- Agent email

[Search] [Clear]

Fig. 10

| HotJobs.com Resumes | Agency Exchange Resumes | | | | | |
|---|---|---|---|---|---|---|
| Name 1410 | Job Title 1412 | Salary 1414 | Location 1418 | Rel | Work Auth | Date | Sel |
| Name Indicator | Widget Maker | $50,000 | New York, NY | Y | USA | 06/21/00 | ☑ |
| Name Indicator | Fry Chef | $100,000 | Brooklyn, NY | Y | USA | 06/21/00 | ☐ |
| Name Indicator | Plucker | $50,000 | Iowa City, IA | Y | USA | 06/21/00 | ☐ |
| Name Indicator | Surfer | $100,000 | Pismo Beach, CA | Y | USA | 06/21/00 | ☐ |

Select an Action ▶ 1422    Go 1424

1420

Actions:

View
Distribute – max 5 resumes
Transfer to MyCandidates
Transfer to Personal Folder
Transfer to Job Candidate Pool HJM can toggle between resume lists by clicking on a folder tab. The screen will not change but a different list will be brought to the foreground.

Fig. 14

SYSTEM AND METHOD FOR AGENCY BASED POSTING AND SEARCHING FOR JOB OPENINGS VIA A COMPUTER SYSTEM AND NETWORK

RELATIONSHIP TO OTHER APPLICATION

This application claims priority from provisional application Ser. No. 60/245,739 filed Nov. 3, 2000.

FIELD OF THE INVENTION

This invention relates generally to a method and apparatus for providing a computer based service for posting and searching job openings. More particularly the present invention comprises a system and method for searching and posting job openings by placement agencies, that is, those entities that search for candidates to provide to a third party for a fee.

BACKGROUND OF THE INVENTION

Posting and searching for jobs is a time honored and laborious task. The most basic route for finding suitable job candidates has been the posting of advertisements in newspapers and magazines noting the availability of a certain position. Job seekers or "candidates" prepare resumes and submit them to various employers who are advertising for a particular job.

In certain cases employers have not wanted their identity to be revealed for fear of being inundated with resumes and telephone contacts. Instead they have chosen to have resumes sent to unmarked P.O. boxes where they can subsequently be reviewed without the potential of hundreds, if not thousands of telephone calls.

As the fields of recruitment and job placement have advanced, a second layer of job placement professionals have arisen. These placement agencies or "head hunters" have typically been used by businesses as a form of filter to receive and process resumes from job applicants. The placement agency serves multiple purposes. First an employer can hire a placement agency ("agencies") to find a candidate (s) to fulfill job slots that are available at the company. The company specifies to the placement agency the type of individuals desired and the agency takes all necessary steps to advertise and recruit individuals to fill vacant slots. The agency receives a fee for these services, which may be substantial.

Candidates (job seekers) apply to agencies based upon advertisements run by the agencies or are interviewed by the agencies, and the most qualified candidates are sent on to the employer for the final interview process. This shields the employer from having to process hundreds of resumes as well as to field hundreds of telephone calls associated with the jobs that are available. There are limits to the success of agencies. For example, there are many thousands of publications in which an agency might advertise for a particular position. However certain agencies have limited budgets and thus may not be able to advertise broadly for a particular position. Where this occurs, the most capable candidate may not be informed of the availability of a particular position.

In order to enhance the probability that the best candidates will be found, many companies have taken to advertising their available positions via the Internet by posting available positions on their respective web sites. Anyone who subscribes to the Internet is able to search for particular companies who have technology and market focus of interest and determine if there are any jobs available by viewing the web site of the particular company.

However the same difficulties that exist in the print media arise for a company when it is posting openings on a web site. Individual candidates (as used here the term "candidate" is synonymous can submit resumes via the Internet or other contact methods. Sorting and follow up associated with the many resumes that are received are the responsibility of the company. Again this task may not be desired to be taken on by the company that must then hire appropriate individuals to screen resumes and interview candidates. Thus the task of the employment agency is still a valuable one.

An additional difficulty with the Internet posting approach by an individual company is that not all web searching engines are created equal. Hence there is a possibility that qualified candidates will not become aware that there are particular job postings available on a particular company's web site. Further the candidate may not even be aware that a particular company exists if the search engine being used by the applicant does not pick up the web site of the company.

Recognizing this job searching dilemma, a new business was born on the web, that is, the "career bulletin board". A career bulletin board is a centralized web site that allows individual companies to post job openings in one central location. Such a career bulletin board may have many hundreds or thousands of companies posting job openings with a wide variety of descriptions of the type of opening, salary, requirements, and the like. Job candidates access the career bulletin board and perform key word searching to find the type of job in which they might be interested.

Conversely, individual candidates can post their resumes in a central file on the career bulletin board. That central file can then be searched by employers who typically pay a fee to the career bulletin board for the right to search resumes that are stored therein. The individual candidate can then be contacted by the companies that are subscribers to the career bulletin board.

Typically career bulletin boards do not charge candidates for access to company posted job listings nor are candidates charged for the right to post their resumes on the career bulletin board.

Companies typically are charged for the right to post a certain number of job openings for a period of time as well as are charged for access to the database of candidates' resumes. In this fashion the career bulletin board generates revenue.

It is also quite typical of such career bulletin boards that placement agencies are not permitted to interact with either the companies or the candidates since there is typically a hefty fee charged by placement agencies for their services. Hence many job bulletin boards do not solicit nor will they entertain participation of placement agencies.

Placement agencies however have been imaginative in how they deal with career bulletin boards. For example in order to circumvent the "no agency" policy of career bulletin boards, a placement agency will post a fictitious resume giving contact information for the fictitious applicant as that of the placement agency. When an employer finds the resume to be attractive and contacts the candidate at the contact information, the company is connected to the placement agency that can then potentially field a candidate at the placement agencies usual and customary fees.

Obviously this type of fraudulent participation is frowned upon by the career bulletin boards but is not easily curtailed. Further, if placement agencies are searching for a particular type of candidate, the placement agency can sign onto the career bulletin board as a fictitious company having a particular opening. When an individual job seeker applies for that opening, the job seeker is connected to the placement agency which when performs the usual and customary screening and introductory tasks on behalf of an employer.

Recognizing that placement agencies do have something to offer in the job seeking and placement process, the present invention is designed to assist in bringing placement agencies, employers (companies), and candidates together in an effective fashion. Therefore what would be particularly useful is a system and method for bringing together placement agencies, candidates, and employers (companies or corporate recruiters) in a coherent fashion that maximizes the availability of jobs to the candidate, generates continuing revenue to the career bulletin board, and allows the placement agency an opportunity to field candidates to employers and to seek qualified candidates for employment positions for which the placement agency is responsible.

SUMMARY OF THE INVENTION

In view of the above market place for career bulletin boards and the simultaneously consistent and opposing interests among companies, placement agencies, and candidates it is therefore an objective of the present invention to facilitate the activities of professionals working for a placement agency (an agency recruiter) to interact with a career bulletin board.

It is a further objective of the present invention to allow a placement agency to create a personal profile on a career bulletin board to market the agency recruiter's capabilities.

It is yet another objective of the present invention to allow an agency recruiter to create profile of the agency recruiter's active candidates or available for job interviews.

It is still another objective of the present invention to permit agency recruiters to emphasize regional and skill specializations in a personal profile.

It is a further objective of the present invention to create a profile for the placement agency on the overall system.

It is still another objective of the present invention to allow placement agencies to post candidates in an agency specific data base portion of the career bulletin board.

It is still another objective of the present invention to allow agency recruiters to create detailed professional profiles for each active candidate.

It is still another objective of the present invention to allow agency candidates, that is, those individuals who are seeking jobs but who are represented by an agency, to be available to the generalized population of companies who are seeking job candidates but who have not selected an agency to represent them.

It is still another objective of the present invention to allow individual candidates to submit resumes to agency recruiters so that they may be represented to companies who have hired the agency recruiter to find suitable candidates.

It is still another objective of the present invention to allow agency recruiters to submit specific resumes to job postings that are generally available on the career bulletin board.

It is still another objective of the present invention to allow companies who are general subscribers to a career bulletin board to search for a recruitment agency based on a variety of criteria.

It is a further objective of the present invention to allow individual companies to create a preferred agents list of those agents with whom the company desires to work.

It is still another objective of the present invention to allow a company to post a job to the entire group of agents who are subscribers to the present invention or to a specific agent as desired.

It is a further objective of the present invention to allow a company to create a file of specific job openings that is shared with a specific agent.

It is still another objective of the present invention to allow any particular company to search for resumes of job seekers from a specific agency database of job applicants who are represented by agents.

It is still a further objective of the present invention to allow agencies a flexible inventory of functions to enhance their business.

It is an objective of the present invention to allow agency recruiters to search for jobs that have been generally posted to an agency portion of the career bulletin board database.

It is still another objective of the present invention to allow agency recruiters to submit candidates to jobs that have been posted directly to them from companies or in the general agency database.

It is another objective of the present invention to allow agency recruiters to receive a percentage fee for any placement that is made.

These objectives are not meant to be limiting and are illustrative only. Other objectives will become apparent to those skilled in the art from a review of the specification that follows.

For purposes of this application, the following definitions apply:
C/PAS—Corporate/Placement Agency System (and all functionality included in the scope of the Agency/Company Member interactions as described herein)
Agency—The placement agency corporate entity for recruiting candidates represented on the CPAS. Each Agency has at least one Office and Agent.
Office—A regional location of a multi-office Agency.
Agent—An individual agency recruiter with a personal login and profile on the AX with links to one Office and one Agency.
AP—Agency Party (this refers to the Agency representative whether that is the Agency Recruiter, and Agency Office Location, or the Agency itself)
AP Hierarchy—The pairing of Agency→Office→Agent that has downstream one-to-many potential relationships and upstream many-to-ones.
CBB—Career Bulletin Boards, through general functionality of a career bulletin board system
CM—Corporate Member (this refers to the corporate user of the system of the present invention whether it is the corporate recruiter or the Company itself)
RWS—Recruiter Webstation (accessed via Corporate Member)
ARWS—Agency Recruiter Webstation (accessed via hotjobs.com/agency/member)
JCP—Corporate member Job Candidate Pool
ACL—Active Candidate List (Candidate List in the ARWS Candidate Manager that lets the AP make up to 20 candidates viewable to the CM's and allows them to sort these active candidates into one or more Candidate Folders.)
VCF—Viewable Candidates Folder (the list of up to 20 candidates on an AP's ACL that are currently searchable by CM's.)
KBS—Resumix Knowledge Base software (for automatically extracting information from resumes in electronic forms tablized values for titles, categories, skills etc.)
AJL—Active Jobs List (this is the Agent's Job Manager screen, consisting of all jobs tagged into the list by the AP or assigned to the Agent by an CM)
CSL—Candidates Submitted List (On the Agency Webstation job list, the AP can click an icon to view a full list of the candidates he has submitted to that job. This is a subset of the job's JCP on the CM Recruiter Webstation.)

CVF—Candidate/Vendor Folder (The candidate folder that aggregates all candidates submitted to an CM by an Agent into a single collection; called the 'Vendor Folder' in the Recruiter Webstation and the 'Client' folder in the Agency Webstation.)

PVL—Preferred Vendors List ("My Vendors" area on the CM's Recruiter Webstation. This is the default screen for the "Vendors" tab and represents a controlled area for an HJM to define his universe of active vendor relationships.

As noted above, the present invention is designed to facilitate company/placement agency interaction in the context of a more generalized career bulletin board. The initial step in the process is for a placement agency to register with the system of the present invention. This is typically done by providing information concerning the placement agency and various identification information (as more fully set forth below), as well as, paying a monthly subscription fee, although this not meant as a limitation. Other fee structures may be charged depending upon the individual commercial situation. Placement agencies may sign up as an entire multi-office agency or simply sign up for an individual office or two depending upon the commercial realities of the situation. Other independent recruiters, who are not associated with an agency, may also sign up for the present invention in a similar fashion to that of agencies.

In the system of the present invention an each agent can enter information concerning the agent's background. For example, in addition to information regarding name, address, telephone numbers and the like, the agent can enter information regarding the industries in which the agent has particular skills, the salary ranges of positions for which the agent is seeking qualified candidates, and associated information. The present invention provides for the agent to be able to edit the agent file and comprises instructions for checking an entries and noting any errors associated with data that has been entered.

Each agent is associated with an agency, even if the agent is an independent or a "one man shop." In a similar fashion to entry of agent data, placement agency data is also entered including name and address of the placement agency and other contact information. Further the placement agency data entry can list industry focus in the event that the agency places, for example, only computer programmers, or only secretarial or support staff. (For purpose of this application the term "placement agency" and "agency" are used interchangeably). The agency data can be edited and appropriate software checked for errors in any data entry and provide error messages to the individual who is entering the agency data. An agent can enter a particular candidate whom the agent represents and whose resume is available to be forwarded to potential corporate placement personnel. Initially a job seeker provides a resume in an electronic form. Data extraction software extracts appropriate information for a "person" file including name, address, telephone number, salary rage desired, whether or not prior work places can me contacted, educational degrees, and the like.

Once the information is extracted it may be edited and any edits that are made are subject to error checking to allow the agent to be sure that the file is appropriate for subsequent uses by the system. It should be noted that the candidate resume will stay in electronic form even though data extracted from the resume is now resident in the "person" file.

During this sign-up process an agency record is created which comprises a agency level profile, a regional office profile, which would be linked to the agency level profile and records associated with individual agents who have permission to work with the present invention.

Requests for agency registration can occur via a web site of the present invention or through various telephonic contact. However, the end result is a database record concerning the agency on the system of the present invention.

A wide variety of agency information is obtained in order to both quality the agency as well as to allow CM's to search agencies having particular characteristics such as major clients, agency focus, last number of placements, technological areas, and the like.

Once an agency account has been opened, the placement agency/agent are notified via e-mail and are provided with user names and passwords in a similar fashion to that known in the art.

Once the account is created for the agency, the agency member can complete any additional user profiles for its agents on a home page which is specifically designed to be the graphical user interface for agencies. The agency home page comprises a web page having a tool bar and navigation aids to allow the agency to perform the variety of functions that are available from the present invention. For example, a "candidate" button allows an agency to post candidate profiles. A "jobs" button allows the agency to view the jobs that have been assigned to the agency by CM's to find qualified candidates. A "clients" button allows an agency to view all resumes submitted to a particular client (a "client", CM typically, is a company seeking to fill a position). A "cover letter" button allows agencies to create standardized letters from templates to be sent to the CM along with the candidate's resume. A "search" button allows agencies to search through a database of jobs posted by CM's and to search for specific candidates who match the qualifications for those jobs. These buttons are not meant as limitations but are illustrative of the types of functions that would be available in the initial page offer to agencies.

The agencies are provided with a wide variety of functions for managing candidates. The agency can post candidates to a database which will allow other agents and companies to search those candidates to determine if they are appropriate for open jobs. Further the agency can search jobs that are available.

Agencies can add candidate resumes into the system of the present invention as well as create detailed professional profiles for each candidate.

It is recognized that not all candidates will be active at all times. Thus an agency can maintain a list of active candidates as well as a list of inactive ones. Agencies can also allow candidates to be viewed by other agencies and/or viewed by the general population of CM's searching for candidates.

Since agencies may represent many candidates in different areas, agencies can using a capability of the present invention, create candidate folders, which allow grouping of candidates by theme (i.e. engineers, doctors, lawyers, administrative). A wide variety of other functions are also available to the agency in order to manage candidates. These are explained more completely below. For example, and without limitation, agencies can add candidates, providing background information as well as specific contact information if desired. Information concerning a summary of the candidate, the desired position, experience level, and other characteristics can be input by the agency.

Once a professional profile for the candidate is submitted, the agency saves the candidate in the particular folder which, as noted above, allows sorting of candidates based upon a variety of characteristics and themes.

Candidates can also be removed from an active candidate list depending upon the individual candidates situation. Further, the agency can chose to conceal candidate information or conversely reveal candidate information in the profile for any resumes that are viewed and/or sent to a potential employer.

Agencies can move candidates from one folder to another as situations change. This allows candidates, who may be able to perform jobs in multiple classifications to be placed in appropriate folders to be used by CM's who are clients of the agency or by CM's searching the agency databases.

In a similar fashion to the way candidates are managed by agencies, so are CM jobs and folders managed. In this instance, as noted above, a CM is the company that is looking for a particular candidate having the requisite qualifications to fill vacant slots. Thus in addition to marketing candidates to CM's, agencies have the opportunity to submit candidates to the general placement system data base in order to be made viewable to other agents or CM's. When this occurs, a CM may chose to establish a constant open contact with an agency by displaying a candidate folder to the agency. That folder would then be presented to the agency's CM folder list and be available for resume submission to the CM. Agents can submit candidates to jobs, view a list of candidates that have previously be submitted and record various notes regarding each job submitted by a CM.

Individual CM may post jobs, and remove jobs regardless of where they reside within the system of the present intention.

Jobs may be specifically assigned by a CM to an agent. In this instance a company CM may desire a job to be handled by a particular agent, having certain characteristics, or may have a successful history with a particular agent. When a CM wishes to post a job to the system of the present invention, the CM can elect to assign a job to a particular agent to be filled. When this occurs the agent receives an e-mail that a job has been assigned specifically to him by a CM.

When an agent clicks on a particular job folder, whether it is specifically assigned to him or in a more generalized portion of the database, a pop up window appears with the formatted job description, profile information and other information concerning the job. Typically jobs are associated with a particular hiring CM. The agency can click on the hiring CM and obtain, in a pop up window, the profile of the CM that will be doing the hiring.

Those candidates being managed by the agency can also be accessed by the agent and appear in a pop up window as well. These candidates have a wide variety of information about them so that the agent can contact them in the event that there is a match between a posted job and a candidate. The agent can then submit a job seeker against a particular job. This submission will include the creation of a cover letter which will go along with the candidate's submission.

When a candidate profile is submitted to a job posting of a CM, the CM is notified via e-mail that a candidate or candidates profile has been submitted to the particular job posting. The e-mail includes the cover letter and links to the agent as well. The candidate's professional profile is attached to the e-mail so that information about the candidate can be directly viewed by the CM.

Agents can search for jobs against which candidates can be posted. The search screen contains such information as the job type, title, skills required, salary, and other information helpful in searching for a position for potential candidate.

A CM has the ability to have an on going connection and relationship with an agency. In so doing, the CM has the ability to make a folder viewable to specific agency(s). In this folder can be an unlimited number of candidates against which the agency may submit potential job seekers. The agency is given the ability to see all of the candidates that have been submitted to various jobs so that the agency can keep track of who was submitted to which position. Any subsequent actions that are taken by the CM, appear to the agency so that the agency can keep tract of the actions taken by the CM.

CM's having jobs to fill, have a wide variety of interactive capability with the various agencies who subscribe to the system. For example, a CM may search for resumes posted by agencies, search for an agency with which to establish a relationship, search for an agent with which to establish a relationship, maintain a list of preferred agents and agencies, make job requirements available to the entire agency database or assign open job requirements only to a specific agent or group of agents. This list of functions is not exhaustive and is for illustrative purposes only. It will be clear to those skilled in the art that other functions may also occur which would facilitate the interaction between companies and agencies.

CM's who are members of the present invention are able to search a database that is specific to the agency database of resumes without having to search the entire CBB. These are resumes that are distinct from the general population of resumes submitted by those candidates who are not represented by agencies. Specific word searches can be conducted and a list of candidates satisfying the requirements are returned to the employer.

While the individual CM's clearly have the option of searching resumes sponsored by various agencies, there is also a suite of functionality associated with the task locating an agency with whom the CM might deal. CM's of the present invention have the ability to locate agencies and their associated offices via the graphical user interface. This is accomplished for several reasons: First, the CM may want to locate a particular agent to place on the CM's vendors list. Further, after locating appropriate agents, companies will want to find resumes to fill open jobs and to establish that the particular agent has qualifications to fill future openings should they occur.

CM's of the present invention can locate agencies by name, location, type, industry focus, job interest focus, the agencies rating (as will be more fully explained below) and individual agent name.

Once the agency is located, the CM can browse through information on the agents by their skills, specialization, and other criteria. Other information, such as the standard fee of the agency, over all rating, client list, and other factors will be displayed for the company to assist the company in potentially selecting that agency as a preferred vendor. Also, an agent level search can also be performed so that a company can obtain information on an individual agent.

Individual member CM's are also be able to assign their job postings directly into an agency whether it be to the agency generally or to specific agents. General functionality of the present invention allows CM's to assign jobs to the entire group of agents who are members of the present invention as well as to post jobs to selected agents and/or agencies within the agency data base. Further, as new agencies join the present invention, any CM is able to search for such new agencies.

As noted above CM's are able to post jobs to multiple preferred vendor groups so that a job may be posted to more than one agency at a time. Further, jobs may be assigned to multiple individual agents as well.

An additional feature of the present invention is a rating capability which allows for the establishment of a rating system associated with agencies which are registered members of the present invention. This rating functionality allows a CM to provide feedback to the community of other CM's on their experience with a particular agency. This will further assist other CM's in establishing their willingness to do business with a certain agency based on the comments and ratings made by other companies. This in turn will lead to enforcement of good business practices among agencies by making them aware of their relative status as compared to other agencies being used by the community of CM's who are members of the present invention.

The system of the present invention allows feedback to be provided on a particular agent. A generalized five-point rating scale, (although this is not meant as a limitation) running from poor service to excellent service. Other types of rating scales will be considered to be within the scope of the present invention.

After the submission of a minimal number of comments (preferably but not limited to five) the average rating for an agent or agency is established. This rating can be viewed by CM's to see what other CM's have to say about the particular agent or agency. Additionally agents are able to view their own ratings so that they can improve their performance where necessary.

The present invention will integrate with other systems for resume submission, sorting, and creation as well as for systems for payment for services rendered during the course of all of the functions noted above.

BRIEF DESCRIPTION OF THE FIGURES

FIG. 9 illustrates the individual recruiter profile page with contacts and descriptive information on the specific recruiter.

FIG. 10 illustrates a company search page whereby a company can access resumes via a search or via specific vendors (recruiting agencies).

FIG. 14 illustrates a search results page that reports on resumes that are in the agency portion of the database as opposed to those resumes that are generally submitted to the database of a career bulletin board.

DETAILED DESCRIPTION OF THE INVENTION

Figure 1:
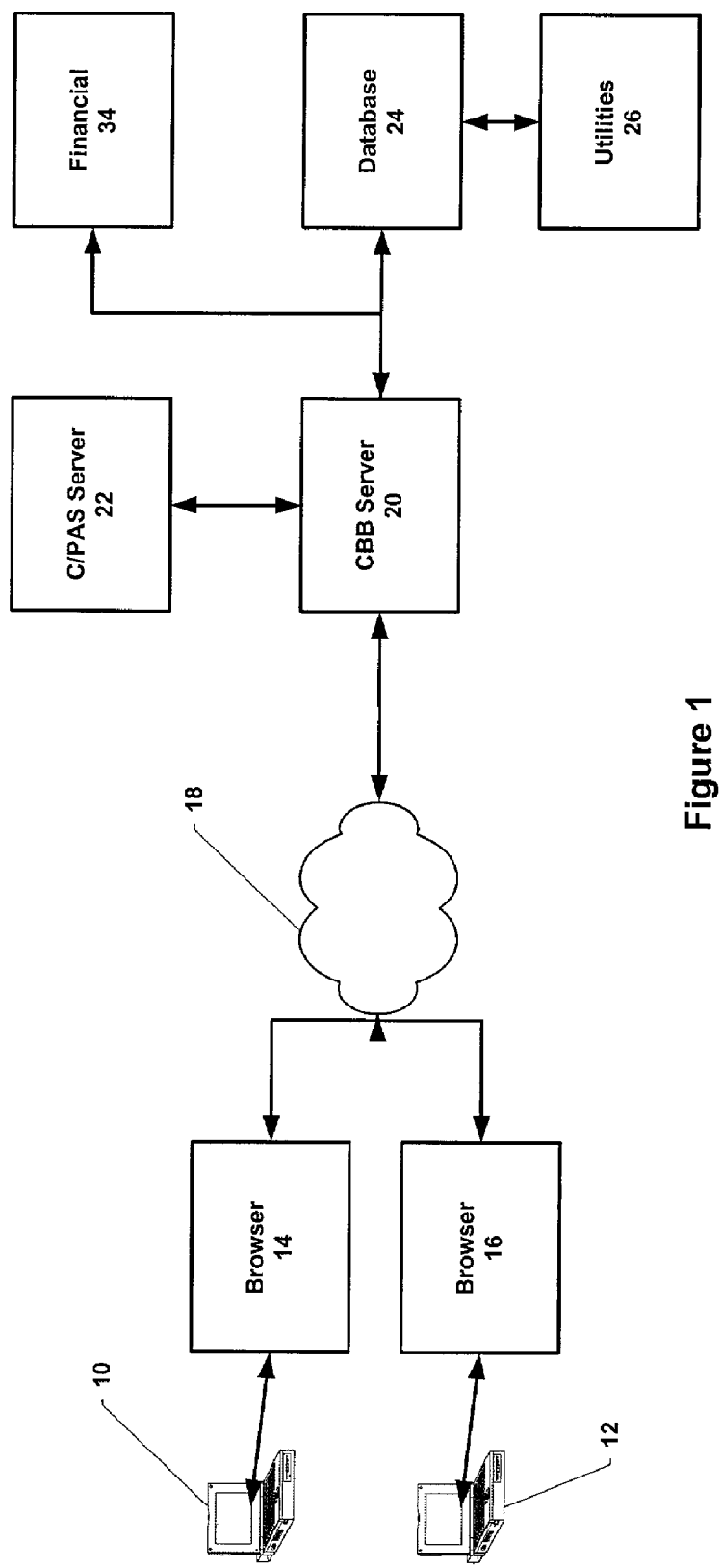
FIG. 1 illustrates the overall architecture of the present invention including (CBB and C/PAS)

The following illustration provides an example of the organization of links and servers of the present invention. For purposes of this illustration, the commercial embodiment is illustrated under the name HOTJOBS, which is the commercial service mark associated with the present invention. Similarly, AGENCY EXCHANGE and the acronyms AX and HJ are also abbreviations for service marks associated with the commercial embodiment of the present invention. For clarity purposes, these commercial service marks and acronyms are used in the following example.

There are three distinct web servers in production for Agency Exchange: the native agency server (AGENCY), the native hotjobs server (HOTJOBS), and the agency-hotjobs integration server (AXHJ).

| | |
|---|---|
| AGENCY: | http://agency.hotjobs.com |
| HOTJOBS: | http://member.hotjobs.com |
| AXHJ: | http://axhj.hotjobs.com |

Each realm (agency member, hotjobs member) has its own directory on each web server:

| | |
|---|---|
| AGENCY: | |
| native: | agency.hotjobs.com/member |
| axhj: | axhj.hotjobs.com/ax |
| hj: | member.hotjobs.com/ax |
| HOTJOBS: | |
| native: | member.hotjobs.com/member |
| axhj: | axhj.hotjobs.com/hj |
| agency: | agency.hotjobs.com/hj | i.e., either realm has a corresponding /ax or /hj directory when on a foreign (non-native) web server.

Separate databases are associated with each web server. None of these three databases (agency, axhj, hotjobs) are linked in any way, and all data sharing between the databases is performed strictly at the application level (i.e. the client's web browser). Thus, http can be considered the primary and only data transport mechanism between the three databases.

The following naming conventions will be used throughout this document:

| | |
|---|---|
| AX | agency exchange |
| HJ | HotJobs |
| Agent | an AX agent as referred to from the agency realm |
| Vendor | an AX agent as referred to from the HotJobs realm |
| Candidate | an AX agent's candidate (person record) |
| Job | a HJ member's job |
| Client | a HJ member as referred to from the agency realm |
| hj member | HotJobs member/user |
| Link | a relationship between an AX agent/candidate and a HJ member |
| native server/layer | the "home" web server of the current realm (e.g. nabby.dev.hotjobs.com for HotJobs) |
| AXHJ server/layer | the axhj server |
| foreign server/layer | the server on the "other side," so-to-speak (e.g. agency.hotjobs.com for HotJobs) |

Link Types

There are four types of links that can be created between agency agents and hotjobs members.

| cgi type | tag prefix | realm | link description |
|---|---|---|---|
| ax-rel | AXR__ | HJ | HJ member -> agent |
| hj-link | HJL__ | HJ | HJ job -> agent |
| ax-rel-link | AXRL__ | AX | AX candidate -> HJ member |
| ax-link | AXL__ | AX | AX candidate -> HJ job |

These links define the sequence of transactions that can occur between a HJ member and AX agent. The first link must always be initiated by the HJ member, with the exception of the agent searching for and "bookmarking" a job made viewable to the exchange by the HJ member. In a typical scenario, the HJ member links him/herself to an agent by finding the agent (via searching or browsing mechanisms), then by adding the agent to their "My Vendors" list. After this initial linkage, the agent will become part of the HJ member's "My Vendors" list, while the HJ member will become part of the AX agent's "My Clients" list. Thus the relationship:

My Vendor (HJ) <====> My Client (AX)

After this link is created, the agent may then submit candidates for review by the HJ member. Similarly, an agent may submit a candidate to a HJ member's specific job after that member has created a link between that job and the agent:

Linked Job (HJ) <====> My Jobs (AX)

Links are unidirectional in that they be created and destroyed by one party and viewed but not destroyed by the reciprocal party. The "realm" column indicates which party can create the link. Thus, links marked "HJ" realm in the table are created by the HJ member and viewed by the AX agent, and vice versa.

Because databases in different realms are not connected in any manner, all fields must be replicated in the integration layer as needed for list viewing of link information (i.e. any fields that will be displayed in cgi list "shorts"). This includes information that will be viewed by BOTH parties (agent and HJ member); e.g. if a job is linked to an agent, the job title, job primary key (pindex), job location, HJ member name (U_GECOS), HJ member company name (G_GECOS), etc. etc. will need to be replicated, in addition to the destination agent's name, primary key, location, etc. etc. Thus, when creating links it is important to remember all the required fields for viewing that link from either realm (AX or HJ).

In order to pass the conglomeration of all necessary fields in a single HTML form variable (e.g. a form checkbox), field name/value pairs are passed in LDIF format. The syntax for LDIF is as follows:

NAME: VALUE\n or:

NAME:: BASE64_ENCODED_VALUE\n

Note the space after the colon(s), and the line break at the end of the line to terminate the record. Double colons are used to specify a value in Base64 encoding. Because line breaks are not interpreted in HTML, line breaks must be escaped using the appropriate character encoding:

Following is an illustration of an LDIF record, in this case for ax-rel (HM member->agent). This is merely used as an illustration. Those skilled in the art will understand that other coding is also possible to accomplish the same task:

```
<input type=checkbox name="REC" value="AXR__AX__UPINDEX::
~|AGT__PINDEX encode base64|~& #010;AXR__AX__AGC__NAME::
~|AGT__AGC__NAME encode base64|~
AXR__AX__AGT__FNAME::
~|AGT__FNAME encode base64|~
AXR__AX__AGT__LNAME::
~|AGT__LNAME encode base64|~
AXR__AX__AGT__FEE::~|AGT__FEE1
encode base64|~
AXR__AX__AGT__IND__FOCUS::~|AGT__IND__FOCUS
encode base64|~
AXR__AX__AGT__JOB__FOCUS::~|AGT__JOB__FOCUS
encode base64|~
AXR__AX__AGT__LOCATION:: ~|AGT__LOCATION encode
base64|~
AXR__HJ__U__GECOS:: ~|U__GECOS encode
base64|~
AXR__HJ__G__GECOS:: ~|G__GECOS encode base64|~
">
```

Links are associated with agency and hotjobs records both directly and indirectly. For instance, the ax-link type (AX candidate->HJ jobs) is associated by primary key with an AX person, a HJ job, and the owner of the job (HJM). In addition, the association with an AX person record implies an indirect association with the parent of that record, i.e. the person's agent. Thus the following table:

| link type | associated records | associated primary keys | indirectly associated records |
|---|---|---|---|
| ax-rel | agent, HJM | AXR__AX__UPINDEX (AGT__PINDEX) AXR__HJ__UPINDEX (U__ACCOUNT) | |
| hj-link | job, agent | HJL__AX__UPINDEX (AGT__PINDEX) HJL__HJ__JPINDEX (J__PINDEX) | HJM [J_OWNER (U__ACCOUNT)] |
| ax-rel-link | HJM, person | AXRL__AX__PPINDEX (P__PINDEX) AXRL__HJ__UPINDEX (U__ACCOUNT) | agent [P_OWNER (AGT__PINDEX)] |
| ax-link | person, job | AXL__AX__PPINDEX (P__PINDEX) AXL__HJ__JPINDEX (J__PINDEX) | agent [P_OWNER (AGT__PINDEX)] HJM [J_OWNER (U__ACCOUNT)] |

Directly associated records have primary key entries in the link data type and thus can be linked directly, whereas indirectly associated records are referenced through those directly associated records (i.e. parent/owner relationships).

FIGS. 1-14 herein represent the system of the present invention and the various screen shots that are illustrative of the functions of the present invention that follow.

Referring first to FIG. 1, the overall architecture of the job placement system comprising the agency interaction of the present invention is illustrated. Individual users who may be employment agencies and/or applicants seeking to post resumes interact through their PC's 10, 12 using web browsers 14, 16 as normally found on such computers. For example Netscape or Microsoft Explorer are suitable browsers for use with the present invention. The users interact over a network 18 which is preferably the Internet but which may be any network such as an Internet, a wireless network, or any other network that can provide by directional communication. Requests to interact with companies or to search a database of available job postings are transmitted to the server 20 which manages the interaction of users with the overall job placement system. The server comprises a database of job listings and other information 24 along with certain utilities 26 to allow data to be parsed to allow searches of the database to be conducted with results being returned to terminals 10, 12, 28 via the server 20.

Also connected to the server of the job placement system 20 is the agency server 22 which comprises the present invention as will be more fully explained below. Finally the overall system comprises a financial functionality 34 that allows the operator of the overall job placement system to settle credit card payments and to receive payments via the normal financial transactions network known in the art.

Figure 2:
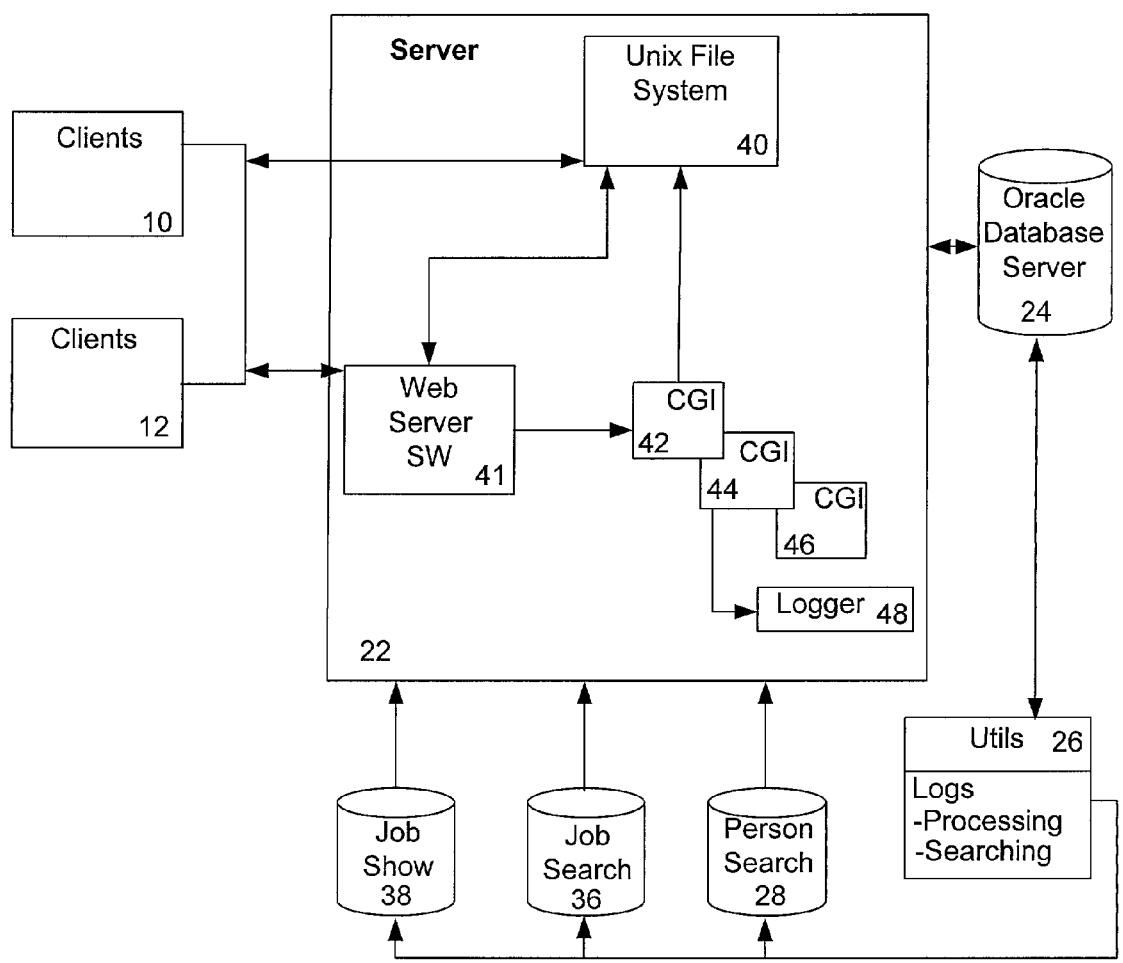
FIG. 2 illustrates the architecture of the C/PAS

Referring now to FIG. 2 the overall C/PAS server, which comprises the present invention is illustrated. The C/PAS server 22 operates in a similar fashion to the overall job placement systems described in FIG. 1, however it relates to the specific transactions that exist between agencies and those users of the system who are companies or entities who are seeking persons to fill specific jobs that are available. Those entities will be hereinafter referred to as "corporate" users although this is not meant to limit the use to corporations. Anyone desiring to have a job listing filled by candidates would be considered for purposes of this application to be a corporate member or CM. Similarly, users of the C/PAS system are generally placement agencies or agents and will be referred to as such throughout this application. The C/PAS server 22 interacts with corporate users and placement agencies via the CBB system server 20, however the C/PAS server 22comprises its own series of communication protocols and exchanges of information. The C/PAS server 22 receives requests from placement agencies and corporate users via computers 10, 12 over normal web browsers. In between those users and the agency exchange server is a series of load balancers (not shown) which simply serve the normal load balancing function to insure that no one server or communications channel within the C/PAS server is overloaded, thereby optimizing response time.

The server 22 comprises a UNIX file system 40, which receives templates to report information required by users, agents and CM's via common gateway interfaces (CGI) 42, 44, and 46.

Data logger 48 logs queries and message traffic from placement agencies and corporate users and stores that information for various processing and searching algorithms via the utilities functionality 26 over the overall system.

As in the overall system, the oracle database server 24 stores job information and agency and corporate user information for subsequent message traffic processing. Information from the oracle server is also stored in a series of separate files. For example the oracle database comprises all types of information. However in the present invention that information is parsed into separate files. For example, a file of persons who are available for jobs 28 is created for search purposes. Similarly, a C/PAS job search file 36, which is similar to the job search file in the overall CBB system is also created. These are jobs which are posted by corporate users and which may be searched by agencies in order to determine if a candidate can fill the particular job.

A job show file 38 is also created specifically for the agency exchange functionality that allows the jobs that have been posted by corporate users to be posted and displayed to placement agencies.

Figure 3:
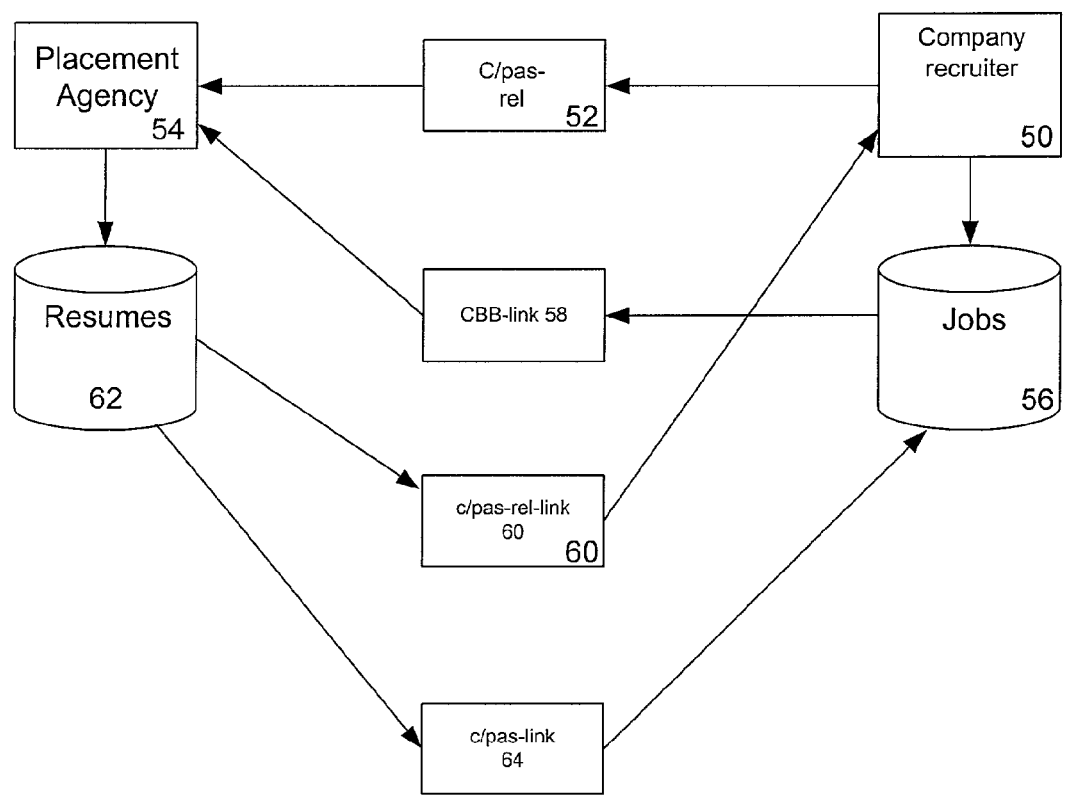
FIG. 3 illustrates the establishment of communication links in accordance with an embodiment of the present invention.

Referring now to FIG. 3, the overall exchange of information in establishment of links is illustrated. When a corporate user 50 desires to establish a relationship with a placement agency 54 the employer can establish that particular link 52 and send a link to the agency recruiter 54. In contrast however, an agency recruiter cannot establish a relationship and hence a link with a corporate user 50 unless that corporate user allows it to happen in the first instance. Once that link is established, the corporate user 50 establishes a database of available positions 56 which are stored in the database of the present invention. If a corporate user 50 desires to post a specific job 56 to the placement agency 54 that job is sent via a specific link 58 to that agency recruiter. The link 58 however is specific to an agency recruiter or series of recruiters with whom the corporate user 50 has established as desired relationships. The job would not go to any other agencies unless the corporate user established a link to that agency. However, as noted earlier, a CM can post a job to all available agencies, and, if an agency has a candidate meeting the job requirements, the agency can submit the candidates' resume to the CM for this one job only.

The agency recruiter 54 which subscribes to the present invention establishes a database of resumes 62 of individuals whom the agency recruiter is representing. The resumes of the placement agency 54 can be stored and accessed (for updating purposes) only by the placement agency 54 or stored in a resume database 62 and submitted via a C/PAS link 64 to the job database 56 of the corporate user 50. In general however when resumes are directly submitted to the job database 56 they are submitted in the expectation that various corporate users will search that job posting file. When a corporate user searches a job posting file and sees a resume of interest, the association of the particular candidate with a particular placement agency is also listed. At that point the corporate user can establish a link 52 with the placement agency 54 to potentially interview that applicant.

In another communication channel, the corporate user 50 posts a job to an associated job file 56. That job is sent via a system link 58 to the agency recruiter 54. The agency recruiter can compare that job requirement to resumes stored in the resume file 62 and provide a specific resume or resumes via a specific relationship link 60 that has been established by the corporate member with the agency recruiter. Such jobs are submitted directly to the corporate user in response to a job posting that was sent to the placement agency 54. As noted above, certain of the links can only be established by one of the two parties (typically the corporate user to the placement agency 54)

Figure 4:
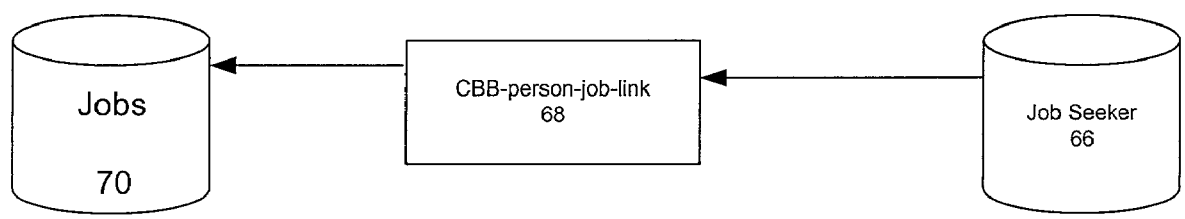
FIG. 4 illustrates a communications link between an individual candidate job seeker and a jobs database in accordance with an embodiment of the present invention.

Referring now to FIG. 4, the relationship between an individual candidate job seeker) with the job file of the present invention is illustrated. An individual job seeker 66 submits a resume in response to a job that maybe listed by a placement agency. That resume then resides in a jobs file 70, which is associated with and can be searched by placement agencies. In this instance job seeker 66 accesses the overall placement system (CBB) and views a particular job that is available. That job may have been placed by the agency recruiter. The person responds to that job and establishes a link between the resume submitted by the job seeker and the job that was posted. That person-job link 68 is then stored in a jobs file 70 which can be accessed by the agency recruiter and either posted to a jobs file generally or posted in response to a specific request for a job from a corporate member.

One of the searchable aspects of the present invention involve using Standard Industrialization Codes (SIC's) which series of codes is well known in the art and whose organization of codes also is incorporated herein in its entirety.

As referred to herein, the terms "HotJobs Agency Exchange" and "AX" are synonymous with the present invention C/PAS. These merely represent the commercial service marks for the present invention as it has been released to the public.

The C/PAS facilitates online interactions between corporate staffing organizations and professional recruiting agencies. The C/PAS will exists as a separate database and functional system from a central generalized computerized placement system (CBB) and integrates at select points into the generalized system to allow for real-time data exchange between the CM's and Agency users of C/PAS.

The system of the present invention provides online registration facilities for Agencies to use to submit an account purchase/set-up request. It also provides a webstation login facility for registered Agency users. C/PAS marketing material and login facilities are integrated into the core CBB front-end employer-related sections as well.

Once an account is created for an Agency user, he will access his C/PAS webstation via an appropriate browser.

CM's users will access C/PAS through functionality of a CM Recruiter Webstation.

CBB Account Management staff are able to administer C/PAS accounts and system data through an internal Agency Administrator Webstation (CBB/agency/admin). The C/PAS Admin site is completely distinct from the existing CBB/admin site.

The Agency Webstation, that is the workstation that a recruiting agency uses to manage its activities within the system of the present invention, comprises a single level of user access and a second access level that allows privileged users to manage (add/edit/delete) accounts and maintain the company profile on behalf of the Agency.

Each participating Agency Recruiter can create a personal profile on the system to market himself and his active candidates to the CM user population. Within this webstation, software and user interface screens permit the Agency Recruiter to:
- create a personal profile for himself marketing his regional and skills specializations (searchable by CM users);
- create a company profile for the Agency
- add candidates to the C/PAS database linked to his user profile
- create a detailed professional profile for each active candidate;
- make candidate profiles concurrently active/viewable to the CM user population
- submit candidates to a folder created specifically for him by a CM user.
- maintain a list of jobs posted directly to the agent or to the general agency population
- search through database of jobs posted to the general agency population
- submit candidates to specific jobs made viewable to the C/PAS user population or specifically to him or his agency by the CM members;
- Agency Administrators will additionally be able to manage user accounts (purchase, create, edit, inactivate user webstations) and create/maintain the Agency (company-level) Profile that is searchable by the CM user population (searchable by region etc.).

Data capture on the C/PAS is table-driven where possible to enhance searchability and data integrity. Knowledge based software is used towards this end to extract and store field values for Employer Name, Job Category & Title, Skills, etc.

The CM initiates all interactions with agency, either by 1) posting a job into the general C/PAS or to one or more specific agencies or agency recruiters; 2) searching the C/PAS resume database and contacting the Agency Party in order to obtain contact information on the candidate; 3) creating a folder for a specific agency recruiter to submit candidates into; or 4) by searching the agencies and agency recruiters listed on the C/PAS and establishing contact with the Agency Parties offline. These interactions are not meant as a limitation. Other types of online interactions are considered to be within the scope of the present invention.

When CM's search against the Candidate Profiles posted in the C/PAS, the C/PAS profiles may be tagged into the CM's Job Candidate Pool or Personal Folders, but candidate contact information will not be viewable on the Profiles and will require offline coordination with the Agency Party to proceed with the screening process for an C/PAS candidate.

A CM has the opportunity to participate in an Agency/Agency Recruiter rating system where CM users may view how other CM's have rated participating agencies or agency recruiters based on past interactions, and assign ratings of their own to the agency parties based on their experiences in the C/PAS.

Agency Parties rated to a certain negative degree are barred from further participation in the C/PAS and removed from the system.

Accounts on the C/PAS must be created and managed (add/edit/delete) by a a CBB Account Manager. Alternatively, accounts may be managed by Agency Admin users via a generic mechanism for account creation used across the products and services of the present invention.

A monthly subscription fee is paid by each Agency on a per-Webstation basis according to a tiered pricing structure known in the art.

The functionality necessary to interact with the C/PAS is incorporated into a standard delivered Recruiter Webstation.

Softshoe/Shoelace, which are programs belonging to Hot-Jobs, Inc., New York City N.Y., whose contents are incorporated herein by reference in their entirety, and whose cross-posted jobs must be routable to the C/PAS from the SS/SL back-ends. Vendor Management Module functionality are incorporated as necessary into the standard application functionality to enable this routing.

International users, since they share the same back-end as the CBB domestic users, are able to route jobs into the C/PAS just as domestic users can.

Agencies may only participate in the C/PAS by signing up as members of the system and typically paying the associated monthly subscription fee. Each Agency Party (AP) must have an Agency company-level record and Office Location affiliation as well as a personal login and user profile in order to post candidates and search member jobs.

Significant diversity is expected in the AX sales/sign-up process: an Agency may join the exchange through contact initiated by a CBB sales rep, through an in-bound telephone or email inquiry, or through an online request for membership. Further, an Agency may sign a nationwide cross-company deal consisting of multiple webstations to represent the entire user population at that Agency; regional offices of a franchised agency may sign up independently and sporadically; or individual agency recruiters may purchase their own subscriptions independent or in advance of an agency-wide deal. Non-affiliated headhunters may also buy personal subscriptions without any major agency affiliation at all.

Regardless of the circumstance surrounding the sign-up, account creation comprises the following elements:

Agency Record (company-level profile)

Agency Office Record (regional office profile linked to an Agency Record)

Agent Record (individual user webstation linked to an Agency Office Record; one or more webstations within an Office Record may have a higher set of access privileges allowing for user account and Agency/Office profile administration)

An Agency Record may have multiple associated Offices & Agents; however, each Office is generally linked to a single Agency, and each Agent is generally linked to a single Office.

The integrity of the Agency/Office/Agent Hierarchy (AP Hierarchy) is maintained by the systems of the present invention. Once an Agency Record is created, any Office or Agent representative of that Agency is linked to that single Agency Record. In general Agency Records exist for a single Agency.

Maintaining the AP Hierarchy ensures the integrity of the Agency Search functionality of the CM, who needs to be able to locate an Agency in the C/PAS database according to location, skill specialization, rating, client list etc. The search results allows the CM to drill down through the AP Hierarchy from an Agency and its profile→a list of all associated Office Locations with separate profiles per Office→separate Agents within an Office and their personal Agent profiles.

The Agency Record must be created before an affiliated Office and Agent can be added to the system. An account management function allows for this creation. Once the Agency Record and at least one Office Record and one Agent Record are created, the AP is allowed to add any additional Office or Agent accounts using the Agency administrator level of access.

There are several ways a request to create an Agency account (an Agency-Record-Create request) can be routed to an Account Manager. Each route must capture the minimum amount of data required to create an Agency Record on the system. These request routes are detailed as follows:

If the Agency submits an account request via the agency website, the purchaser must be informed of the terms and conditions of participating in the AX and must submit all information necessary to create the account and process the bill.

The Agency-Account-Create-Request Form screen comprises the field elements: such as but without limitation, legal terms Agency identification information, billing information.

Agency Headquarter Location (City, State free input with USPS verification)
    Agency Headquarter Telephone Number
    Number of US Office Locations
    Locations to be listed on the Exchange
    Date Agency Founded (YYYY)
    Number of Employees
    Agency Type (Public, Private, Franchise, Independent)
    Industry Focus
    Job Focus
    Standard Fee (%)
    Major Clients
    URL (links to Agency Website)
    Agency Description (HTML compatible)
    Activation Date (dd/mm/yyyy; defaults to current date)
    optionally request DUNS #'s
    Number of Accounts to be purchased
    Desired Account Activation Date
    Billing Contact Name & Address
    Billing Type (Allow for credit card purchase online & no invoice option.)
    Credit Card Information The system also requests user information for a specific agency person permitted to access the system. Such user information is, without limitation, First Name
    Last Name
    Email Address (need text indicating that email address will serve as log-in name)
    Office Location
    Telephone Number
    Password
    Activation Date Once the request is submitted the information is provided to a system level Account Manager to verify that the Agency is unique (and not otherwise duplicated in the system), that the billing and account set-up information is complete, and that the requesting party is in good financial standing.

If information is incomplete or incorrect, the reviewer must take the necessary steps to complete or correct the data. Once everything is correctly entered account requests will be accepted and processed with the following effects:

A new Agency Record is created with the submitted information and activated on the date specified. New Office Location Records are created for each Office Location specified and activated in tandem with the Agency Record activation. New Agent Records are created for each user specified and activated on the date specified. Email notification with URL and password information sent to each new user. Upon first time login the Agency user must complete a profile with missing info before proceeding with core functionality of the present invention.

In an alternate embodiment of the Agency Record creation process, Agencies can submit an account request via the telephone or an email whenever the Agency is informed of the terms and conditions of participating in the C/PAS prior to the account creation. Further the Agency must deliver all information necessary to create the account and process any resulting invoice. Any other necessary records are created as noted above.

Once the account request form in processed and Agency record is creating comprising.

Agency Name
    Account Executive responsible for the Agency
    Account Manager for the Agency
    Headquarter Location (City, State)
    Headquarter Telephone Number
    Number of US Office Locations
    Date Founded (YYYY)
    Number of Employees
    Agency Type (Public, Private, Franchise, Independent??)
    Industry Focus
    Job Focus
    Standard Fee (%)
    Major Clients
    URL (links to Agency Website)
    Agency Description
    Activation Date Similarly, a Office Locator record is also created comprising Office Location1 (City, State w/USPS value verification, or Regions select mechanism)
    Location Street Address1, 2
    Location Main Telephone Number
    Location Number Employees
    Location Industry Focus
    Location Job Focus
    Location Standard Fee (%)

Location Major Clients (lookup against Resumix employer list?)
Location URL
Location Description
Multiple office location records can be created for a given Agency In addition, an agent record is created for each agent associated with an agency. That agent record comprises.
First Name
Last Name
Email Address
Office Location
Telephone Number
Cell Phone Number
Agent Industry Focus
Agent Job Focus
Agent Standard Fee (%)
Agent Major Clients
Number of Active Candidates Allowed
Number of Searchable Candidates Allowed
Activation Date (dd/mm/yyyy)
Password
Usemrname (defaults to Email Address)

Once an account has been created for an AP, an email notification is automatically dispatched to the user communicating the login URL and Username/Password information.

The AP then accesses the /agency/member site and completes his User Profile before proceeding with any of the core AX functionality. The system of the present invention recognizes a first-time user vs a repeat visit. A user would be recognized as a first-time user until the Profile is complete at which point all subsequent logins allow for normal interactions with the system. An agent cannot view or use core functionality until at least the User Profile is complete.

The AP Homepage consists of a toolbar and navigation aids consisting of the following elements:—although the elements should not be viewed as limiting.

HOME—Used by the agent to return to their home page.
CANDIDATES—Takes the agent to the candidate manager
Used by the agent to enter a candidate profile
Used by the agent to manage personal candidate lists.
JOBS—Takes the agent to the job manager
Used by the agent to view jobs that have been assigned to him or his AP hierarchy by member companies within the Hotjobs.com network.
Used by agent to manage jobs that were found via a job search.
Used by the agent to search for a job opening. A search executes against the subset of the larger HotJobs database that has been made viewable to the Exchange.
CLIENTS—Takes the agent to their Client Folder Manager
Allows Agent to view all resumes submitted to a single HJM and submit additional resumes directly into HJM folders
COVER LETTER—Takes the agent to his cover letter manager
Used by the agent to add/edit/delete cover letter templates
SEARCH—Used by the agent to search through database of jobs posted to general agency population and to search through candidate folders for a specific candidate
HELP—Takes the agent to help and FAQ's section
Used by agent to find answers to frequently asked questions.

Navigation Aids:
"For functional & technical support" (Name of Rep that will assist agent in the event of system failure, training issues, etc.)
"For sales inquiries" (Name of AE that sold agent the product and email link.
MY PROFILE
Used by the agent to edit the Agent Profile.
LOG-IN SETTINGS
Used by Agent to change password & username settings
FEEDBACK (email link)
LOGOUT—Lets agent log out of current session.
BANNER ADVERTISING—Shows agent banner advertising options.
REPORTS—Allows agent to gauge the success of their efforts with specific HotJobs.com member companies, success within specific industries/channels, success within specific geographic regions, etc.
ADMIN—Admin level access only
Used by administrator to view/create/edit company profile
Used by administrator to assign/remove users, post messages, etc.

Once the User Profile has been completed, the AP may proceed using the AX core functionality to post candidates and search jobs.

This candidate management screen allows the agent user to:
Add Candidate resumes into the system
Create a detailed Professional Profile for each candidate
Maintain a list of Active Candidates
Maintain concurrent Viewable Candidates within those Active candidates (viewable candidates are searchable by the CM's; Active Candidates can be made viewable/private at any time.
Create Personal Candidate Folders to group candidates by theme
View a consolidated list of all active candidates in the webstation
Perform a 'Quick Search' on candidate name from an input search box at the top of every screen within the Candidates tab section
Link a candidate to an HJM job with a cover letter attached
Distribute candidate resumes via email to HJM's (with option to reveal or conceal candidate contact information from Profile)
Duplicate Candidate profiles (create a copy of an existing profile and have appear as a new header-less record in the Active list:
Remove candidates from the system entirely
An AP has the ability to view search/show/submit stats on candidates
Resume sharing between Agents belonging to the same Agency is also a function of the present invention.

The 'Find Candidate' quick search function allows the user to input a candidate full or partial name and search against the full ACL contents distributed across the Candidate Folders to locate someone immediately.

A 'View All Candidates' link generates a screen that presents the consolidated candidate slate, gathering all of the candidates stored in the various theme folders and including a display status icon indicating a candidate's inclusion in the Viewable Candidate Folder. Batch actions are be capable from this list according to the workflow and screen elements described below in the Candidate Folders and Submit Candidates sections.

On the "add candidate page", a "browse" button allows the Agent to find the resume in Word document format that the agent are looking to add to their candidates list.

When adding a candidate, various steps are steps performed in the back-end following the input of a candidate's resume.
1. The document is converted to a text file.
2. The text file is passed through a skills extraction engine.
3. The extracted skills are assigned to the component field values in appropriate records within the system.
4. The text file is added to the entity as a BLOB field.
5. A PDF file is created for presentation.

Following a submission of a candidate's resume by this method, the Agent is taken through an edit process where the agent can double check the validity of the fields that have been populated by the skills extraction engine. To accommodate instances where the AP does not have a resume for the candidate, a facility on the Add Candidate default page allows the Agent to bypass the extraction process and proceed directly to a blank Professional Profile page to create the record.

The system checks against the number of records in the Active Candidates List to make sure there are fewer than any number of records permitted; The system prevents the AP from adding another candidate until one or more of the Active records is deleted.

Whether it is pre-populated by the skills Extraction Engine or keyed in manually, the Professional Profile page will comprise the following screen elements:
First Name
Last Name
Email
Address
City, State, Zip, Province, Country (USPS codes enforced)
Home Phone
Day Phone
Mobile Phone
Candidate Name Designator (either a nickname chosen by AP or a system-generated #)
Candidate Summary (free-text box; HTML compatible)
Desired Position Type (FT, PT Contract, Temporary radio buttons a la hotjobs.com)
Experience Level (Internship, Entry-Level, Mid-to-Senior, Executive radio buttons a la hotjobs.com)
Most Recent Employer (Lookup against Resumix KB and/or free-entry)
Job Type Preference1 (Channel Pull-down or Resumix categories)
Job Title (Job Interest pull-down or Resumix Titles)
Job Type Preference2 (Channel Pull-down or Resumix categories)
Desired Salary Range (pull-downs a la hotjobs.com)
Technical Skills & Skill Levels (lookup against Resumix KB. Have an upper limit of skills and allow them to rank the person's skill level)
Non-technical Skills & Skill Levels (lookup against Resumix KB. Have an upper limit of skills and allow them to rank the person's skill level.)
Desired Areas of Employment (lookup against region values; searchable by CM's)
Legally Authorized to work in (specific country)
Most Advanced Degree Attained/Pursued
Major
Date of Graduation
School information
SAT Math Verbal
GRE Math Verbal Analytical
GMAT
LSAT
Resume The Candidate Add form also allows the AP to preview the profile prior to submitting the form. This allows the AP to see the formatted results in the same frame etc. as seen by the HJM when posted to the C/PAS.

A section at the bottom of the Add Candidate screen asks the agent user to indicate where the system should add the candidate within his Candidate Folder system. Each Agency Webstation comes delivered with an empty Default Folder and an empty Viewable Folder. The AP can save into either or both of these folders in addition to creating a custom folder or saving to a custom folder previously created:

The agent is asked to indicate in which folder this candidate should be stored and whether to make this candidate searchable by the CM's.

Once a Professional Profile is submitted, the AP is redirected to the Folder List to which the candidate was just saved, default sorted in descending chronological order keyed off of the Edit Date on the Candidate Record (the newly added candidate will sit at the top of the list). In cases where the candidate was made viewable, the redirect will be to the Viewable Folder; all others will redirect to the theme folder.

Before the candidate is accepted by the system and added to the AP's slate, the system checks against the total number of candidates in the ACL as well as the number of viewable candidates vs the number of candidates allowed for that user (as configured by the Account Manager in the user's account permissions.

The (ACL) Active Candidate List for and agent contains candidate slots, which may be concurrently viewable to the CM's in the C/PAS database. The VCF represents all those candidates currently searchable by the CM population. Candidates may be moved out of or into the VCF from any of the other folders. Deleting a candidate entirely from the system must be done from a theme folder or from the candidate record but not from the VCF.

The VCF comprises the following screen elements: although these are not limiting
Candidate Name
Job Type/Job Title
Desired Salary
Location
Candidate Job Pool Icon (clicks into list of all jobs linked to candidate)
The VCF header indicates the total number of Active Candidates in the webstation and the total # of Viewable Candidates within those. It also contains a pull-down and a GO button for performing batch actions against one or more candidates in the VCF.

The batch mechanism at the header of the VCF allows users to:
a) Remove Candidates from Viewable List (toggles the viewable/private settings)
b) Email Resumes (batch distribute)
c) Link to Client Job/Folder
Remove Candidates from Viewable List Candidates removed from the VCF remain in their respective home theme folders.

The system also allows an AP to set a block on the candidate's behalf. This will make it more difficult for a CM to identify a candidate who is currently an employee as a person who is now a job-seeker.

"Email Resumes" function allows the AP to send multiple resumes to one or more email addresses.

When the user selects 'Email Resumes' the system pops up a window asking the agent user to input the required email information: The agent user can also conceal candidate contact information from the profile (default setting) or reveal candidate contact information on profile as desired.

The agent can also append a cover letter to each resume send a Profile & Resumes as attachments or send Profile & Resume as text within the email.

When the agent user clicks SEND, the pop-up window closes and the emails are dispatched. The user's name, contact information and cover letter are inserted into the header paragraph of the email, as well as a link to the AP's profile on the C/PAS, followed by the Candidate's Professional Profile and the Resume (attachments or body text) and some marketing info about the C/PAS.

Once a resume is distributed, a Distribute Activity is logged against the person record in the C/PAS system. The agent-user is then directed to the VCF.

a) Link to Client Job/Folder

This feature allows the AP to link one or more candidates to a job posted by a CM to the C/PAS or into a CM Agent Folder. The agent-user will be able to select multiple candidates and then browse through their client job & folders lists to select combinations thereof, review the selected parties, and commit the transaction. This is similar to a shopping cart selection metaphor.

Selecting 'Link to Client Job/Folder' prompts a pop-up window that contains the following elements without limitation:

1. Select the Client Job(s) to which an agent would like to submit candidates.
2. Select the Client Folder(s) to which an agent would like to submit candidates.

When the agent clicks on the SUBMIT CANDIDATES button the candidates are sent to the CM and the transaction is closed. Candidates and jobs/folders are then linked.

Within the CM portions of the system, the Candidates are added either to the job's JCP or to the CM's Agent Folder for that AP with an AX designation and without any contact information revealed. The CM is notified of the link via an email notification containing the same information sent in the Distribute email, with the exception that all linked candidate emails conceal contact information, whereas in the Distribute action the AP may choose to reveal the contact info.

The VCF represents a viewable subset of the full ACL. All candidates in the system must be created and saved to a Candidate Folder in order to be made viewable to CM's.

An AP may organize his candidates into Candidate Folders customizable by theme (region, skill etc.).

The Agency Webstation comes delivered with a 'Default Folder' for inaugural candidate creation; custom folders can be created anytime subsequent to the first login via the Add Candidates screen as described above or from the Candidate Folder list page, accessible from a 'Candidate Folders' link in the CANDIDATES tab.

In the present invention C/PAS, users have the ability to add candidates to the system and act as the sole manager of these candidates' movements in the system. In other words, each candidate record has a unique owner in the AP; that owner definitively determines the owned candidate's existence and state.

When an AP clicks on the 'Candidate Folders' link on the CANDIDATES tab, the agent is taken to a screen that lists all existing candidate theme folders, including the Default Folder. Sort order is alphabetical by Folder Name.

Clicking into a folder name brings the agent to the candidate list within the folder, that list comprising the following screen elements without limitation:

Candidate Name (fname lname; clicks into Candidate Record)
Job Type/Job Title (or category/title from KBS)
Desired Salary
Location
Edit Date (optional)
Candidate Job Pool Icon (clicks into list of all jobs linked to candidate).

The Candidate Folder list header indicates the total number of Candidates in the folder. It also contains a pull-down and a GO button for performing batch actions against one or more candidates in the folder.

Candidate Folder candidate list batch actions include:
Email Resumes (batch distribute)
Add/Remove from Viewable Folder (2 separate values in the pull-down)
Transfer Candidate to Different Folder
Delete from System Email Resumes behaves in the same fashion as the corresponding VCF action (see above).

Add/Remove from Viewable Folder allows an AP to make candidates viewable or private from individual folder lists. There is a display status indicator on the candidate list indicating which records are currently viewable. An agent is able to add a record to the VCF on the record line or through this batch action, which would perform the requested action and redirect you to this same folder list with the display status indicators refreshed to indicate the actions just performed.

The function must check against the existing number of records in the VCF and verify that the requested transfer is possible without exceeding the configured record limit in the VCF.

Transfer to Different Folder allows the AP to move the candidate from its current home theme folder to a different home theme folder; a candidate may only exist in one theme folder at a time (duplication is only allowed between the VCF and a theme folder). This option brings up a pop-up window asking the user to select a different folder (not including the VCF) or to key in the name of a new folder they would like to create.

A candidates' display status and home folder does not impact the candidate's state in the CM system (i.e. the candidate will still remain in a JCP or Personal Folder or wherever it resides in CM regardless of its state in the C/PAS as long as it still exists somewhere in the C/PAS.

As long as it is active (i.e., exists in an AP candidate folder) on the system, a candidate record maintains all of the data associated with it to date, including its Professional Profile, Resume, Linked Job List, AP Notes and Cover Letter Portfolio. All data remains intact with the exception of the Linked Job List, which will retain only those jobs still in existence on the CM site. In other words, the Linked Job List will deteriorate over time as the jobs are deleted from the system by their CM owners or as the CM owners remove the candidate from a job's JCP. The data associated with a linked job may change prior to being deleted; all edits to a job cascade down to the Linked Job List; the CM is the undisputed owner of the Job Record.

Deleting a candidate record from the C/PAS system maybe done from the any of the folder candidate lists on an individual or batch basis. In either case, the deletion is final and cascades to all occurrences of that record in the system since the AP is the sole and definitive owner of the record. Consequently, the candidate record will be deleted from the VCF and all candidate lists on the CM side.

The AP is informed of these effects and the finality of the action via the confirm-del pop-up window and asked to verify the request by clicking Yes or No.

When an AP clicks on a Candidate's Name from any of the candidate lists, the Candidate Record appears with Professional Profile Show page as the default screen. The Candidate-Record-Show page comprises the following tabs without limitations:
- Professional Profile
- Resume
- Notes
- Linked Client Jobs/Folder List (can link to additional jobs/users from this screen)
- Distribute
- Show Activities
- Duplicate Icon
- Change Display Status Icon (adds or removes candidate from Viewable Candidate Folder)

The Duplicate function allows the AP to use that candidate's Professional Profile as a template for future candidates with similar Profile attributes by duplicating the record (thereby producing an active copy of the candidate while leaving that archived candidate record dormant). When a record is duplicated, only the Profile is duplicated. The resume text must be entered as in a new candidate.

In addition to marketing candidates to the CM's, AP's have the opportunity to submit candidates to the subset of the CBB Jobs database that has been made viewable specifically to the Agent or to any other point higher on the AP Hierarchy (i.e., an Agent may search against all jobs that have been made viewable to the general C/PAS, to that Agent's Agency or Office Location, or specifically to that Agent).

Additionally, a CM may choose to establish a constant open connection with an AP by displaying a Candidate Folder to that AP; the folder would then appear on the AP's Client Folder list and be available for resume submission independent of specific job candidate pools.

These submissions may occur via the Candidate Folder lists as described above, or may be routed from the "JOBS" or "CLIENTS" tabs depending on user preference and according to the following workflow.

In order to submit a candidate to a Client Job, the Agent must first tag the job into his Job Manager Active Job List. When the Agent clicks on the JOBS tab from the main toolbar, the agent is taken to their Active Job List as the default page. The navigation facility on this page consists of a link to the Search Jobs screen ('Search Jobs').

The Active Job List (AJL) includes all jobs posted to the Agent as well as any jobs that have been tagged by the Agent into the AJL. (Jobs posted to the general Exchange, an Agency and/or Office Location will not be automatically added to the AJL; only jobs posted specifically to the Agent will be automatically added to the list. Other jobs become viewable to an Agent in a job search but not added directly to the AJL.)

The Agent can submit candidates to jobs, view a list of candidates they have previously submitted, and record notes on jobs from the AJL. A job that has been in the AJL untouched, for example, 90 days expires and is automatically removed from the list.

The CM is the definitive and sole owner of the job; the Agent may remove jobs from his AJL but is unable to delete a job entirely from the system, edit the actual job information or add a job to the system. The system functionality includes a shared notes function that allows the CM and AP to communicate about a particular user on a single online text box linked to the person and/or job records.

The AJL screen comprises the following elements without limitations:
- Job Title (links to Job-show page)
- Hiring Company Name (links to company profile page with limited company job list (i.e., no jobs displayed unless they have been specifically posted to the AP. Other jobs active in the CM's Job Manager would not be displayed here.) Location
- Salary Range
- Date Last Edited
- Candidates Submitted (links to list of candidates submitted by that Agent to the job)
- Submit Candidate (pop-up window allowing for resume submittal & cover letter)
- Notes (notes icon; produces a pop-up window)
- Remove Job
- 'Select' Check Box The Assigned Job List (AJL) page also includes a header that allows the AP to perform batch actions against the list. The batch action pull-down should allow for the following actions: Submit Candidates; Remove Jobs.

The AJL has a cap of a certain number of jobs. If a CM tries to assign a job to an Agent who has hit the job limit, the CM is notified on the screen (pop-up window) that the Agent's Assigned Job List has exceeded. An email is sent to the Agent notifying the agent that he has hit the job limit has been reached.

When a CM assigns a job to an Agent, an indicator on the main toolbar of the Agency Webstation flags the presence of a newly assigned job When the Agent clicks into the AJL the newly assigned jobs are listed in a different color. If the agent does not act on a newly assigned job, the system sends the CM job owner an email notifying them that the Agent has not viewed the job and that they may want to consider establishing contact offline or assigning the job to alternate Agents.

The system also sends the Agent an email when a job is assigned specifically to him by a CM informing him that a new job is waiting for him in his AJL. The body of the email contains a link to the "job-show" page. Jobs will remain in the AJL for as long as they remain alive in the CM's Job Manager and viewable to that AP. Since the CM is the definitive owner of the job, edits made to the job will cascade to the job in the AJL.

Jobs made un-viewable to the AP or totally private will be removed from the AJL. Jobs made re-viewable to the AP will be re-added to the AJL along with all of the data originally linked to the job by the AP (candidates submitted and Notes).

Jobs deleted entirely from the system will be deleted from the AJL along with any notes the AP may have attached to the job as well as the record of candidates submitted by AP's. Since the AP is the sole owner of the candidate record, deleted jobs will not result in any actual candidate record deletion but will result in the deletion of the 'Candidates Submitted' list associated with the job.

When an AP clicks on a Job Title from a Search Results list or his AJL, a pop-up window appears with the public job-show page similar to what is viewable to the a job seeker. The formatted job description and profile information appears in an un-editable screen. Resumes must be submitted to a job using the Batch Select actions or the 'Submit' icon on the list screen.

When the AP clicks the Hiring Company Name from the AJL, a pop-up window appears displaying the public company profile, along with the total jobs list consisting only of those jobs made viewable to that AP.

The Candidates Submitted List contains only those candidates owned by the Agent and appears as a pop-up window. Other candidates submitted by other Agents within the Agency can also be viewed at the option of the Agency and Agent. The CSL screen comprises the following elements:
- Candidate Name
- Current Job Title
- Current Employer
- Location
- Salary Range
- Date Submitted
- Jobs Applied (links to list of other jobs the Agent has submitted the candidate to)
- Remove Candidate from List ('Remove' icon)

Removing a candidate from the list does not delete the record from the system since it must exist in either the ACL or an Archive Folder and may only be deleted from one of those locations. Removing a candidate from the list DOES remove the candidate from the CM's JCP;

When the Agent clicks the 'Submit Candidate' icon from the AJL a pop-up window appears containing a consolidated ACL candidate slate (aggregated list of all candidates across all Personal Folders within that AP's webstation). The display status icon should be included on the list indicating a candidate's inclusion on the VCF.

The Submit Candidate pop-up window list comprises the following elements:
- Candidate Name
- Current Job Title
- Current Employer
- Location
- Salary Range
- Date Last Edited
- Display Status Icon
- 'Select' Check Box The Agent uses the "Select" check boxes to select up to the candidates to submit to the job. The header of the list includes a Cover Letter selection pull-down and edit text box as well as the 'Submit Candidates' button. If a cover letter is selected it is attached to the beginning of the emailed Profiles but is not otherwise stored in the JCP or on the candidate records.

When the AP clicks SUBMIT CANDIDATES, the pop-up window refreshes to an action confirmation screen containing a candidates list frame, a job list frame, and a cover letter frame—all read-only—with an EDIT button on each frame.

Clicking EDIT refreshes the frame with the original list presented to the user with the records previously selected indicated by filled-in check boxes. The user may de-select or add records from this screen and click "SAVE EDITS" to continue. The cover letter Edit function allows the user to edit and preview the text. SAVE EDITS refreshes the frame with the new selections.

The bottom of the screen contains a SUBMIT CANDIDATES button that commits the transaction and closes the pop-up window. Candidates and jobs are linked and added to each others submit lists by the system.

The CM is notified via email that candidates have been submitted to his job. The email includes the cover letter, link to Agent Profile, and Candidate's Professional Profile and link to the Professional Profile in the JCP. Note that candidate contact information and resume are not included in the email nor are they displayed to the CM in the JCP.

Once a candidate is submitted to a job, that job appears on the candidate's Linked Jobs List. Communication between the CM and the AP beyond this point is handled off-line.

'Submit Candidates' as a batch action uses the above functionality to allow an Agent to submit multiple candidates to multiple jobs or multiple candidates to a single job.

In order to add jobs to the AJL, the Agent must first locate the jobs via a job search, which can be conducted through the 'Search Jobs' screen accessed by clicking that link from the JOBS tab. The Job Search executes against all of the CM jobs that have been made viewable to the Agent or his Agency or Office Location.

The Search Jobs screen comprises the following elements:
- Job Type
- Job Title
- Skills
- Geographic Location
- Salary Range (pull-down)
- Hiring Company Name Keyword
- Experience Level (Radio Button: Entry Level etc.)
- Date Posted (days pull-down) The search returns a list of results displaying the following columns:
- Job Title (Actual Job Title on job; not KB Title value. This links to the job-show page.)
- Job Type/Job Interest
- Hiring Company Name (links to Company Profile page)
- Location
- Salary Range
- Date Last Edited
- 'Select' Check Box The header of the results list includes a 'Refine Search' option that functions similarly to the Hotjobs.com 'Refine Search' option.

The header also includes a Batch Action pull-down consisting of the 'Add Jobs to My Active Job List' option. When the Agent selects one or more jobs and executes this command, those jobs are transferred to the top of the AJL. Candidates may only be submitted through the AJL screen. Jobs must be transferred from the search results list to the AJL prior to having candidates submitted or notes taken.

In order to establish an ongoing, ever-live connection with an AP, a CM has the ability to make a folder viewable to a specific AP. This folder is 'always on' in the sense that an AP may submit an unlimited number of candidates into this folder for the CM's review without linking the candidates to a specific job. The CM does have the option to turn off the folder if it does not want the Agent to submit any more candidates for a certain period of time—any data that has been entered remains and is not deleted from the list.

On the CM "My Vendors" screen, this appears as a 'Vendor Folder' and represents the entire slate of candidates submitted by that AP, including those submitted directly into a JCP as well as those into the general 'always on' folder. This is a consolidated candidate slate per vendor that would allow for a one-stop CM review of the candidates from the agency. A one-on-one communication area between the CM and each AP, including shared notes is also part of the function of the present invention The MY CLIENTS screen defaults to a list of Client Folders comprising the following columns:
- Hiring Company Name (links to company profile screen)
- Hiring Manager's Name (dead; doesn't link to anything)
- Date Last Edited
- View Candidates Icon (links to full Candidates Submitted List, including those submitted to Jobs owned by that HJM or into the Client Folder)
- Submit Candidates Icon (links to pop-up window of ACL list as described in JOBS section above)
- Batch 'Select' Check Box A candidate folder is created automatically in the event a CM submits a job to a particular agent. The Client Folder list header includes a batch action "Submit Candidates" button.

When an AP clicks the 'View Candidates' icon, a Candidates Submitted List (CSL) appears similar to the one seen on the JOBS screen. The Client/Vender Folder (CVF) CSL is the complete set of candidates on the system submitted to a CM by the Agent; the Job-level CSL represents a subset of the CVF list.

Since the CM creates the Client/Vendor Folder (CVF), the CM is the definitive owner of the CVF's existence and state. Only the CM may add, control the display status of, edit, or delete a CVF. However, only an AP may contribute to the contents, either by submitting a candidate to a job or directly into the CVF. Either party may remove candidates from the folder. When this occurs a notification is sent to the other party of the removal.

If an AP submits a candidate to multiple jobs, submits a candidate to a job subsequent to having submitted it into that CM's CVF, or alternately submits the candidate into a CVF after already having submitted that candidate to one of that CM's jobs (and the job still exists on the system), duplicate instances of the candidate are not created on a list. The Date Edited on the Candidate will adjust to reflect the most recent submit date on the Candidates Submitted List but only a single instance of any one candidate will ever occur in the CVF.

Any relevant actions taken on a candidate from another list will cascade into the CVF:
- if a CM removes a candidate from a JCP, and the candidate owes its presence in the CVF to that job, the candidate is removed from the CVF
- if a Job is deleted and the candidate owes its presence in the CVF to the link to that job's JCP, that candidate will be removed from the CVF
- in a related action, if the CM removes an AP from his Preferred Vendors list, the CVF is deleted altogether
- if an AP deletes the candidate from the system, it is deleted from the CVF.

Scenarios that would not affect the CVF contents include:
- if an CM makes a job private the CVF contents are unaffected
- if an AP transfers the candidate between Candidate Folder lists subsequent to submitting it to a job or a folder, the CVF contents are unaffected
- if an AP makes a candidate private the CVF contents are unaffected The CM webstations will be given extended core functionality to interact with the Agency Exchange. The CM member webstations will initiate all contact with the Agency Exchange members via various inroads to the AP Hierarchy.

Within the CM/Member Webstation the CM may:
- Search for resumes posted to the exchange by Agency Parties
- Search for an agency (s) to establish a relationship with
- Search for an agent (s) to establish a relationship with
- Maintain a list of Preferred Vendors
- Organize vendors into Folders
- View a consolidated list of all Preferred Vendors associated with their Webstation
- Perform a quick search to locate a vendor by name
- Make job requests viewable to the entire Agency Exchange
- Assign open job requests to a specific Agent or group of Agents
- View aggregated lists of candidates per AP in 'Vendor Submit List Folders'
- Post the folder into the AP's Client Folder list to allow for ongoing, non-job related candidate submissions from that AP
- Differentiate between jobs posted to the Agency Exchange vs. those in the general job posting system
- Differentiate between resumes derived from the Agency Exchange vs. those in the general job posting system proper within resume lists such as the JCP, myCandidates and Candidate folders The additional functionality will be accessible through a single "Vendors" tab on the CM Recruiter Webstation main toolbar. Select components of the vendor functions will also be integrated into existing screens, including:
- ability to post a job into the C/PAS from the Job Manager jobs list
- ability to view C/PAS resumes submitted to a job from the JCP, which must be enhanced to include tabs representing each exchange source
- ability to expand a resume search to include C/PAS resumes
- ability to view combined search results in search results list, which must be enhanced to include tabs representing each exchange source
- transfer C/PAS candidates into Personal Folders or JCP's from the search results list A 'Vendors' tab in the CM Recruiter Webstation defaults to a Preferred Vendors List ("My Vendors") with the following sub-toolbar links: Search Vendors; Search Resumes.

The Preferred Vendors List (PVL) represents all of the CM's vendor relationships and is the list against which all Vendor link lookups execute within the Recruiter Webstation (i.e., an HJM must tag a vendor into the list prior to posting a job specifically to that agent). The PVL is a cross between the AP's Active Candidate List and Active Job List in the sense that it allows the user to generate lists deliberately via search/tag mechanisms (like the AP's AJL) but insists on folder organization within the overall list (like the AP's ACL).

The CM is the sole owner and manager of the PVL; and is the only party able to control its additions, edits or deletions. The PVL components are individual Agents stored in a system-delivered Default Folder which may be further assembled into arbitrary agent theme folders (i.e., Technical Recruiters, NYC Recruiters, etc.). Agency and Office records may not be represented on the list; only an Agent may be designated as a Preferred Vendor.

A CM must locate an agent via a Vendor Search in order to tag an agent into the PVL. If the CM makes a job viewable to the entire vendor population, and an AP submits a candidate to that job, the agent still is not added to the PVL. The CM must deliberately tag the agent into the list.

The CM may post jobs to components of the PVL from the Vendors tab or from the Job Manager list. Each agent on the PVL has an associated folder that contains an aggregated list of candidates submitted by that agent to that CM's jobs. A candidate that has been submitted and remains untouched for a definable period of days will expire and be automatically removed from the list.

The CM may choose to open the folder up to the agent to allow the agent to submit candidates on an ongoing basis without submitting them into specific jobs. Making a folder 'open' or 'on' causes the folder to be added to the agent's 'My Clients' list as described in the above section. A graphic indicator and toggle switch allows for display state of a Vendor Folder.

The CM has the option to turn off a specific folder for any given period of time. Turning off the folder does not result in the loss of any data. The list stays in tact. The only affect of turning off the folder is that an agent can no longer submit resumes to the folder until the folder has been turned back on.

The CM has the ability to search for vendors. This will contain search/browse mechanisms for locating an AP by skill specialization, region, etc.

The CM has the ability to search resumes. This function contains a stand-alone interface for searching against the C/PAS resume database.

The CM is able to execute a search against the C/PAS resume database without having to navigate to the separate Vendor tab; the existing CM resume search interface allows the CM to expand a search to include the C/PAS resumes in addition to the HJ resumes.

The SEARCH screen available to the CM includes all of the existing fields as well as a series of check boxes at the bottom of the form with the following options: Search the resume databases:

When the search results are returned, C/PAS candidates appear in a separate AX tab from those resumes generally submitted to do the job placement system.

The C/PAS candidates have a special Agency designator attached in all occurrences in the Recruiter Webstation.

The candidate results listing has the following elements without limitation:
  C/PAS flag
  Name designator (links to Professional Profile screen; must use a candidate code rather than name)
  Job Title
  Employer
  Location
  Salary
  Relocation
  Work Authorization (Country)
  Date Submitted
  'Select' Check Box A Privacy setting may be configured by the Agent on behalf of the candidate. Within the results list the recruiter should be able to use the batch action mechanism to transfer candidates within their webstation.
  Batch Actions Include:
  Transfer to my Candidates
  Transfer to folder
  Transfer to JCP
  Distribute
  View Multiple In this scenario the CM proceeds to select a candidate from the C/PAS-designated list of resumes.

On the Professional Profile page the recruiter can view resumes with the following elements
  Resume
  Notes
  Transfer
  Activities
  Distribute The CM views the Professional Profile and is able to perform those functions, noted above.

The Professional Profile includes the listing Agent's name and company name, with links off of those to the respective profiles.

At this stage the CM either decided to work with the Professional Profile by incorporating it into one or more candidate lists, or return to the search results list. Therefore there are several actions available to the CM from the Professional Profile page:
  Return to search results
  Tag the resume (the AP remains unaware that a resume has been tagged by an CM).

The CM has the ability to add the Agent to its preferred vendor list

If the CM wishes to learn more about the agent, as in his rating etc., the CM can access this information via the standard hyperlinks on the AP Profile pages, which open up secondary windows:
  Agency profile
  Agency website
  Agent rating
  Agent Client list
  Agent Viewable Candidate List If contact with the agent is desired, the system allows for initiating contact with the Agent through online facilities such as personal chat etc.

The most likely interaction will be that the CM will transfer one or more AX resumes into a candidate list within his webstation. When the CM has moved a resume into one of his folders this resume should retain the designation that it is an Agency Exchange resume and should have the appropriate activities associated with this record. CM companies have the ability to locate Agencies and their associated Offices and Agents via the "Vendors" tab. There are several capabilities associated with this search functionality:
  The CM can locate an Agent to insert into its Vendor List
  The CM can drill down to resumes provided by Agents in order to:
  Find a resume to fill an open position
  Find resumes which will establish that the Agent has the qualifications to fill future openings and should thereby be incorporated into their Vendor List The CM navigates to the "Vendors" tab and clicks the 'Search Vendors' sub-toolbar link.
  The CM is able to locate vendors by the following criteria:
  Text keyword
  Agency Name
  Agency Office location
  Agency Type
  Industry focus
  Job Focus
  Standard Fee
  Rating category
  Individual Agent Name
  Additional search options are:
  Browse by Company Name
  Browse by Location
  Browse by Skills Specialization
  Quick Search on Company/Recruiter Name Each of these will offer browse functionality, employing a UI including map for regions, name list for Company, and category & skills drill-downs for Skills Specialization). When an Agent drills down to an Agent-level list using a browse screen, the agent should have all of the action capabilities from that Agent list that he would have in a search results agent list, as described below.

Once the search form is submitted the search results are returned with Agent-level listings (company name will be a column in the search results page but the listing is not at the company level; it lists every single Agent meeting the search criteria).

The system also returns an Agency-level listing that can be selectively drilled-down to see recruiters within each Agency, as follows:
  AP Search Results—Company
  AP Search Result List Values:
  Agency Name
  Industry focus
  Job focus Standard fee
Location(s)
Overall Rating
Client List
A 'Select' check box so that batch functionality can be performed.
Batch functionality would include
View Profiles
Add to Preferred Vendor List—Selecting this would allow them to self-designate a label to associate with this list of preferred vendors. This would be analogous functionality to the "Sort to Folder" feature on Hotjobs.com, so that they would be able to either add vendors to an established preferred vendor list, or they would be able to designate a new grouping and name such a grouping. Eg. Technology Vendors, or DBA Agencies.
Assign jobs—selecting this would pull the CM through to the "Assign Jobs" interface.

The CM may view the results list and drill down to Agency or Agent Profiles by clicking on the hyperlinked names or by selecting the View Multiple option from the batch function menu.

Agent-level Search Results list:
Agency Name (links to Agency Profile)
Agent Name (links to Agent Profile)
Agent Fee
Agent Location (links to Office Location Profile)
Agent Industry Focus
Agent Job Focus
Number of resumes
Agent Rating (links to full rating page)
Select Check Box The CM can either add the Agent to their preferred vendor list, return to search results or click on an individual Agent's name or Agency's name to the Profile Screen.

A header at the top of the results list includes a REFINE SEARCH option, which takes the user back to the search page, pre-populated with current search parameters, which the user may edit and click a button to re-execute the search.

The header of the Agent results list screen also includes an "Add To Preferred Vendor List" button to be used in conjunction with the Select check boxes to add multiple Agents into the PVL at once. Adding one or more Agents into the PVL and clicking "Add to PVL"takes the user to pop-up window asking them to select a folder or create a new folder to add the vendor into within the PVL.

If at any time in the above process a CM clicks an Agency or Agent name, the CM will be able to view their respective profile pages and drill down to associated candidate records from those screens, as follows:

Agency Show Screen
  Elements:
  Agency Name
  Link to Agency website
  Headquarter location
  Agency Phone number
  Industry Focus
  Job Focus
  Standard Fee
  Major Clients
  # of recruiters
  Overall Rating
  Agency description (HTML compatible)
  Quick keyword search
  Office Locations (links to location list, where you can browse/drill down to agent lists with each office)
  Recruiters (see AP Show Company—Agent List Elements; sorted alphabetically by default.)
  Button for Assigning jobs to entire agency (this would pull the HJM through to the assign jobs page—see below)
  Button for adding Agency to preferred Vendor List
  Add to Preferred Vendor List—Selecting this would allow the CM to self-designate a label to associate with this list of preferred vendors so that the CM would be able to either add vendors to an established preferred vendor list, or the CM would be able to designate a new grouping and name such a grouping. Eg. Technology Vendors, or DBA Agencies.

AP Show Agent—Agent Profile Page
Agent Profile Elements:
Agency Name
Link to Agency website
Agent Telephone number
Agent Office Location
Agent Industry Focus
Agent Job Focus
Standard Fee
Major Clients
Candidate List (viewable candidates only)
Overall rating
Assign jobs button—Lead to assignment interface
Back to Agency Profile Button
Add to Preferred Vendor List—Selecting this would allow CMs to self-designate a label to associate with this list of preferred vendors. The CM would be able to either add vendors to an established preferred vendor list, or the CM would be able to designate a new grouping and name such a grouping. Eg. Technology Vendors, or DBA Agencies.

Resume Listings comprise the following elements:
Resume Designation other than name of applicant
Applicant Job Title
Applicant Industry interest
Applicant Job interest
Applicant Location
Applicant Desired Salary
Applicant Work Authorization At this level the CM may add this particular agent to the Preferred Vendor List.

The CM may also drill down into an individual Candidate Professional Profile and view it. At this point the CM is looking at the same screen as described in the above section for searching for a resume on the Agency Exchange and perform all the same functionality with such a candidate profile. The CM would click on one of the resume designators and be pulled through to the Professional Profile View screen.

The CM assigns their job postings directly into the Agency Exchange at any level of the AP Hierarchy.

The assign jobs interface of the present invention:
Allows the CM to post jobs to entire Exchange
Allows the CM to post jobs to select vendors within the Exchange
CM's are able to locate new vendors from Assign Jobs Interface
Allows CM's to post jobs to multiple preferred Vendor Groups
Allows CM's to post jobs to Agent within Agency within Preferred Vendor group
Allows CM's to post jobs to multiple Agents
Allows CM's to post jobs to multiple combinations of the above The CM UI allows for centralized job posting and destination viewing.

The CM can elect to assign his or her jobs to any segment of the AP Hierarchy. The jobs are selected from the list of job openings currently viewable within the CM Job Manager. The CM may select one or many jobs using 'Select' check boxes.

The CM may select a "Post My Jobs To:" pull-down menu of the Job Manager to allow the CM to choose the categorical destination for the selected jobs. For example:

The general placement system
C/PAS
Other third party systems
The user agent makes a selection and clicks CONTINUE.

The pop-up window refreshes with a framed screen displaying the jobs selected on one side with the destinations selected on the other side. Each frame has an EDIT button allowing them to alter the selections. The full screen has a CANCEL and POST THESE JOBS NOW button. 'Cancel' aborts the transaction and redirects to the Job Manager. 'Post Now' commits the transaction and redirects to a confirmation screen displaying confirming that the jobs were posted (should be an un-editable version of the previous framed screen) and giving the user the option to 'Return to the Job Manager.'

Clicking 'C/PAS' pops up a window with all of the Agents stored in the PVL as well as a check box option to 'OR Post to All Vendors.'

If the CM opts to post to all vendors, the pop-up refreshes with a framed read-only confirmation screen confirming the job and all-vendors selections and including an EDIT button for each (returning user to previous screen to select individual agents or to job manager job selection screen), and a 'POST JOBS NOW' button that commits the transaction. If committed, the user is redirected to a confirmation screen verifying that the job(s) have been made searchable and giving the user the option to 'Return to My Job Manager.'

Note that posting to all vendors makes the job viewable in searches executed by any AP member of the C/PAS. It does NOT cause the job to be added to any individual agent job managers; it simply makes the job viewable in AP searches.

Alternately, the user may choose to post jobs only to specific agents using the PVL selection list on the pop-up window.

The PVL list will list individual agents (name links to Profile) as well as their Agency Name (links to Agency Profile), Location, Skills Specialization, Client List (link), and Rating (links to full rating screen).

The user selects one or more agents and clicks 'CONTINUE.' The pop-up window refreshes with a framed confirmation screen listing the selected jobs and the selected agents, with EDIT buttons in each frame that will return them to the respective selection screens.

The full screen has a CANCEL and POST THESE JOBS NOW button. 'Cancel' aborts the transaction and redirects to the Job Manager. 'Post Now' commits the transaction and redirects to a confirmation screen displaying confirming that the jobs were posted (should be an un-editable version of the previous framed screen) and giving the user the option to 'Return to the Job Manager.'

Once back at the Job Manager, the CM views where a job is currently posted and for batch-refreshing the jobs within each categorical destination.

The system of the present invention also comprises a rating function. The purpose of the rating system is 3-fold. It allows a CM the ability to provide feedback to the CM community on their experience with a certain agency. It enables the CM to gauge their willingness to do business with a certain Agent or Agency based on comments and ratings entered by other CM's. It enforces good business habits among agencies by making them aware of their relative status and allows CM's to weed out less effective agents from the C/PAS community.

CM's who have done business with a specific agent will be able to provide feedback on the quality of service they have experienced with the agent. In addition, CM's who are considering working with an agent will have the ability to view comments and see an overall rating. Ratings such as those noted below maybe used with the present invention.

Excellent service
Above average service
Average service
Below average service
Poor service Other types of numeric symbol based and letter ratings may also be used. Such ratings are included alongside the agent's name each time the name appears as the result of a search.

The CM locates the name of the agent by performing a search. On the agent profile page, there will be a link titled "enter feedback on this agent". This screen allows the CM to supply a brief comment and enter a rating on the agent. After a number of submitted comments, the average rating of the agent will is calculated and becomes active and valid.

The rating screen has fields for the user name and password of the CM submitting the comment for authentication purposes. The screen also has a field for the user id of the Agent being commented on which will auto-populate. There are buttons specifying the nature of the comment, positive, neutral or negative. There is a button to submit the comment, and one to clear the form and start from scratch. There is also literature explaining to the CM that a comment, once entered, cannot be retracted.

Having performed a search for an agent, there will be a link on the Agent's profile page titled "See what other CM users have to say about this agent". This link will take the CM to a page that shows a matrix displaying the nature of comments that were received regarding that particular agent.

a) Profile section: On the screen is the brief profile of the agent and a display of the average scores that the agent has accrued.

b) A brief breakdown of the comments that were received will also be displayed.

c) On the screen will be the time period during which the comment was received (6+months ago, 1-6 months ago, in the last month), and the nature of the comment that was received also displayed will be the number of comments received in a given time frame (indicates how much activity the agent has been involved in recently) and the total.

Actual Comments: will be listed according to the following template: "Name of User who submitted the comment", "Date the comment was submitted", and, "the nature of the comment," and "the actual comment that was entered".

In addition, the system provides a link that takes the CM to a page that describes in greater detail the nature of the "Rating Forum".

An agent's ratings and comments are viewable to the agent so they can monitor feedback and adjust their behavior accordingly. This is accomplished by providing a link to the above page either from the ARWS home page, or from their agent profile page.

A reverse rating functionality is built in to the system; in other words, agents will be able to rate CM's and provide comments made viewable to other agents on the exchange.

The above explanation of the system of the present invention provides details of the present invention. The following explanation of figures illustrates the graphical user interface of both the CM and the agent in interacting with the capabilities of the present invention.

Figure 4A:
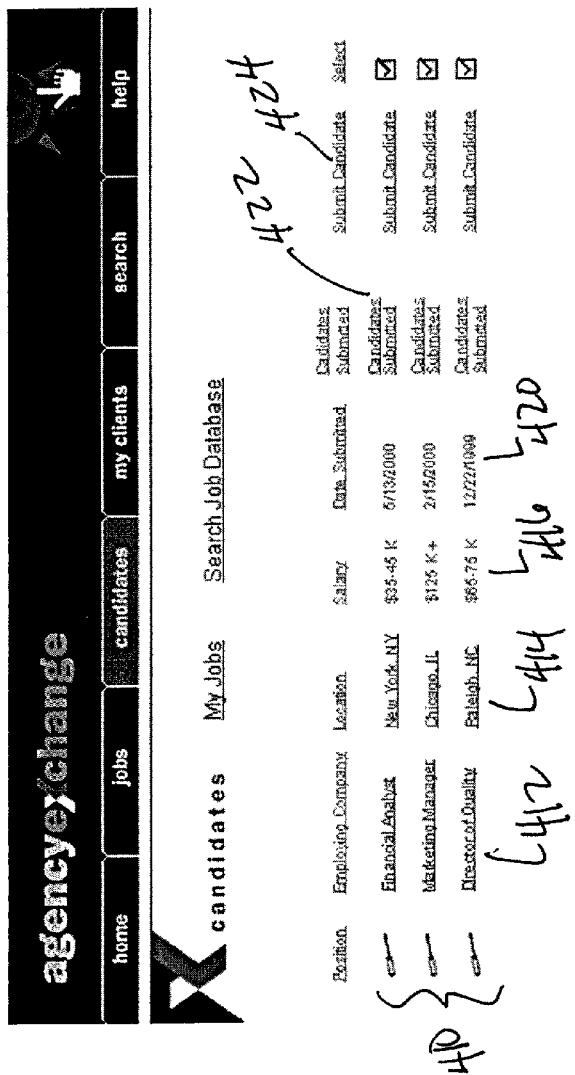
FIG. 4A illustrates the job search function screen of the agent.
Figure 4A:

Referring to FIG. 4A, the job search function screen of the agent is illustrated. The agent can search a jobs database of jobs posted by CM's. In this search the agent can modify the position desired 410 and view the company 412 sending the job to the agent for candidates. The job location 414 is displayed of the job that is available. Also disclosed din this search are salary range, date the job was submitted to the agent and whether a candidate was submitted byte ha gent 422. The agent can also submit further candidates 424 as desired.

Figure 5:
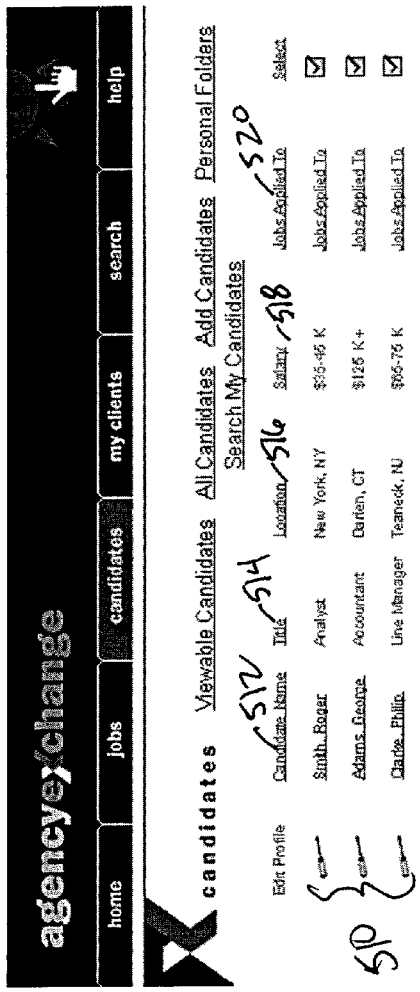
FIG. 5 illustrates the specific candidates who are available for suitable positions.
Figure 5:

Referring to FIG. 5, the candidate management page of the agent is illustrated. A profile 510 is created by the agent and can be edited at any time. This profile can be automatically created by data extraction software that takes information from electronically submitted resumes from candidates. THE name of each candidate 512 is show along with their job title 514, location 516 and salary range desired 518. THE agent can also click on an area 520 that will pop up the jobs to which the agent submitted the candidate's profile/resume.

Figure 6:
FIG. 6 illustrates the company contact information for the recruiter to enable contacts within the company that requires jobs to be filled.

Referring to FIG. 6, the clients of an agent and their management is illustrated. THE companies 610 who are clients of the agent are displayed. These are clients (CM's) who have elected to establish a relationship, and hence a communication link, with the agent. THE point of contact 612 within each client is shown as is the date any candidate was submitted tot hat client 614. the agent can click on a "candidate submitted" area 616 to see the identity of the candidates submitted to the client to prevent any duplication of effort. If there are more candidates to submit, the agent can so indicate 618 and send more candidate information.

Figure 7:
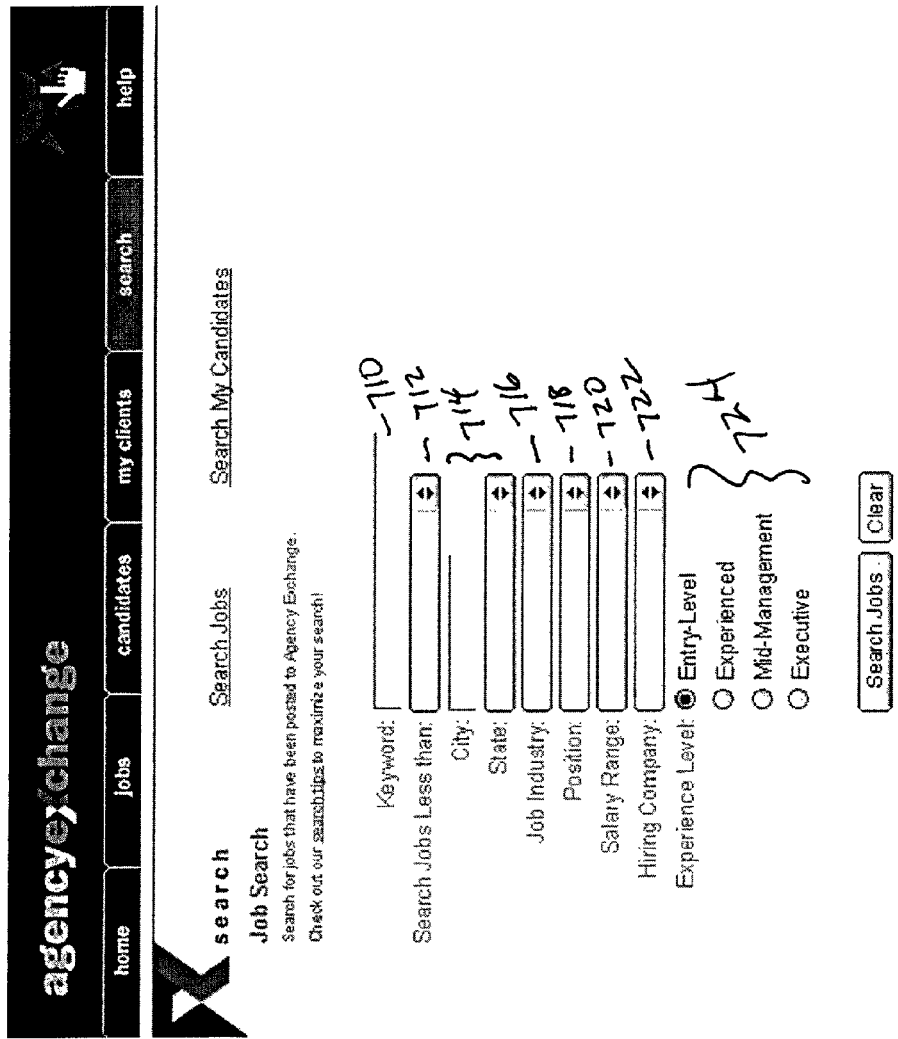
FIG. 7 illustrates the search screen allowing jobs to be searched for using keywords and other discriminating factors.
Figure 7:

Referring now to FIG. 7, the agent's job search page is illustrated. THE agent can search for jobs that have been established by a CM by inputting keywords 710 and various search parameters such as distance 712 from a given location 714, the industry of interest 716, the position 718, salary range 720, the hiring company 722, and level of experience desired 724. This job search is a more general one in that a specific communication link has not yet been established by the CM. Until such time as a link has been created, the agent can only submit candidates generally to a candidate database that is searchable by the CM.

Figure 8:
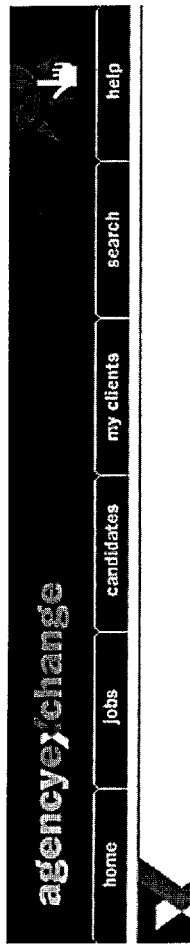
FIG. 8 illustrates the Agency profile page providing information on the recruiting agency.
Figure 8:

Referring to FIG. 8 the agency profile page is illustrated. As part of the registration process an agency identification is created. Since all agents must be members of an agency, this is a key piece of information and allows CM's to search for agency capabilities. Such information as name and location 810, URL 812, industry focus 814 and employees and revenue 816 are solicited for input. TO the extent that the Agency is publicly trade 818, this information is also input. The agency can also put in a small blurb 822 on the agency and its capabilities. This information will be displayed to the CM when the CM searches for agencies with whom to establish relationships.

Figure 9:
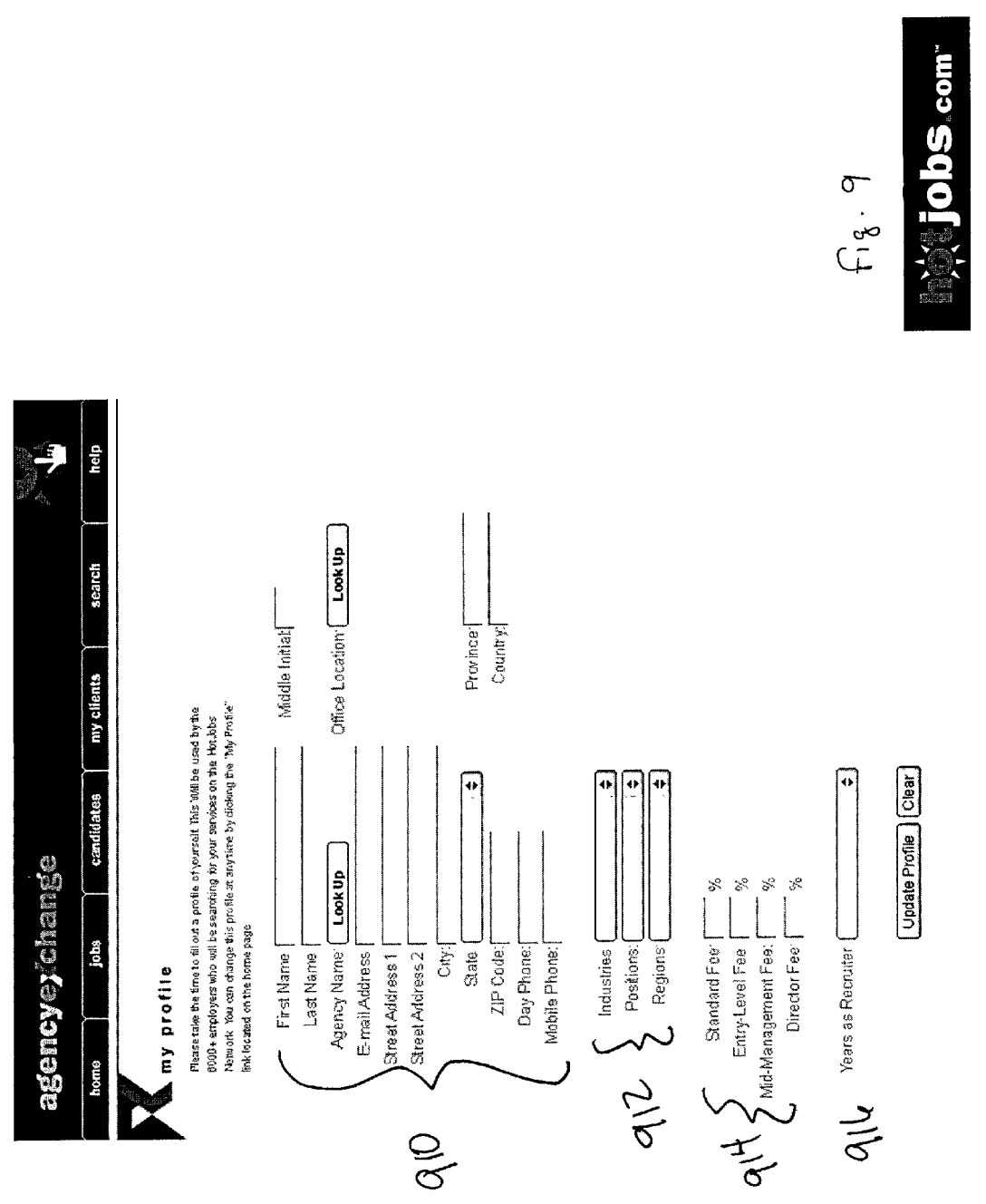

Referring now to FIG. 9, after the agency identification is established, an individual agent(s) can establish a profile. Personal identification information 910 is provided to the system and is the industry focus and performance 912 of the agent. The fees charged by the agent 914 for various positions is solicited along with years of experience 916. This information is sorted and is also searchable by the CM.

For example, FIG. 10 illustrates and agency party (AP) search page. Buttons on the page allows the CM to manage and input information on jobs 1010 for which the CM has openings, candidates 1012 who have been submitted in response to jobs of the CM. "vendors" 1014, that is the Agencies with whom the CM has relationships, a search function 1016 to help the CM find information desired, and help function 1018. From this page the CM can search resumes generally 1020 for candidates who are available from and agent(s), search for agents 1022 having particular characteristics and expertise with whom the CM would like to establish a relationship, and also search for agencies 1024 having particular qualifications of importance to the CM. In this illustration, the AP search page comprises factors 1026 that can be input by the CM in executing the desired search. Similarly, the CM can input specific information about and agent 1028 and be take to that agent's web page.

Figure 11:
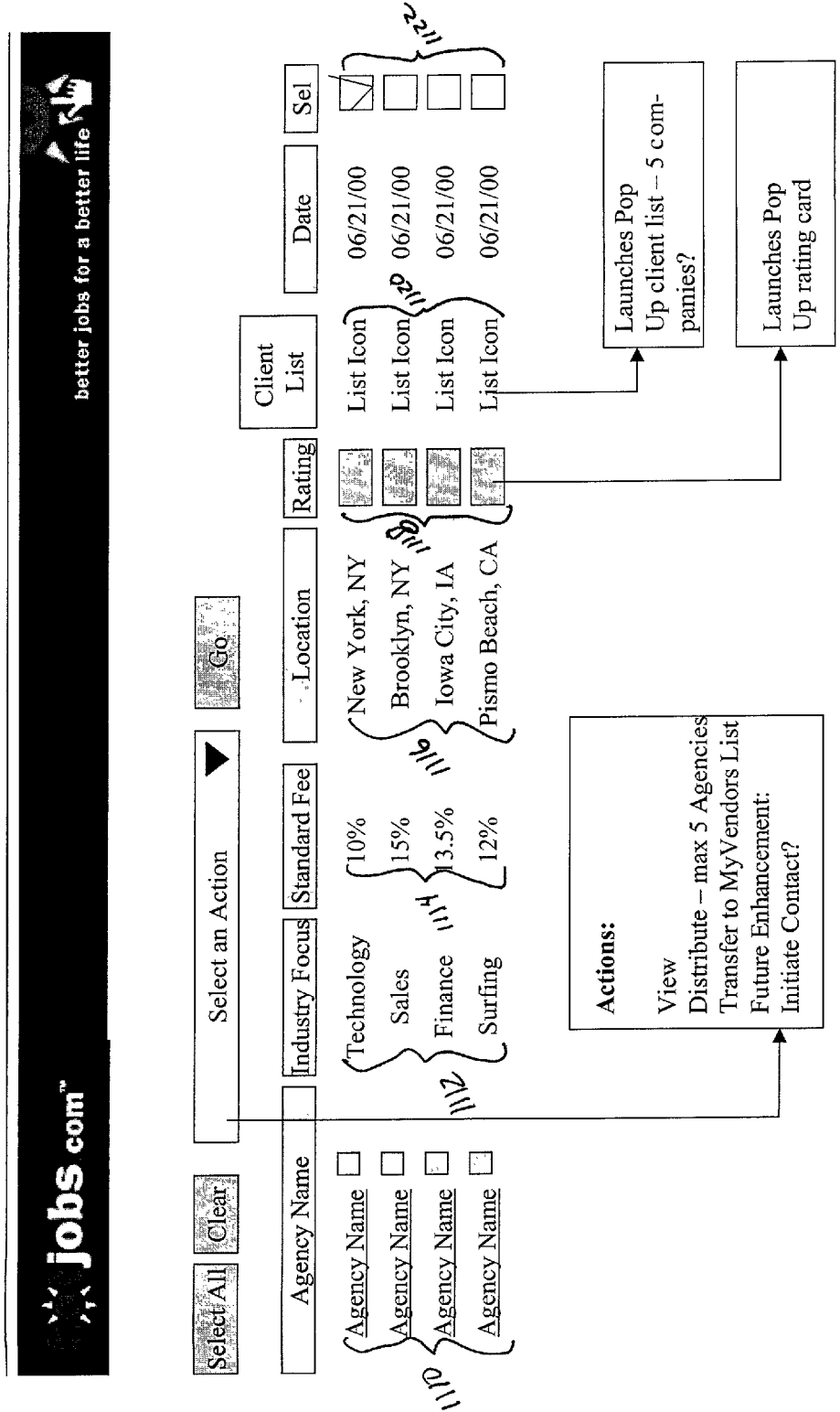
FIG. 11 illustrates an agency search screen showing results of searching for recruiting agencies.

Referring to FIG. 11, the results of a typical AP search are illustrated. Upon execution of a search by the CM a series of agencies 1110 are revealed that match the search parameters entered. The industry focus of the agencies 1112 are show as are the fees charged by the agencies 1114. Agency location 116 is displays along with a button 1118 that allows a CM to find out how peers of the CM have rated the agency in question. If the agencies have provided appropriate information a list of clients 1120 can be accessed by the CM to see the types of clients that have hired any particular agency. If the CM sees and agency of interest, a box can be checked 1122 and more information about that agency can be obtained.

Figure 12:
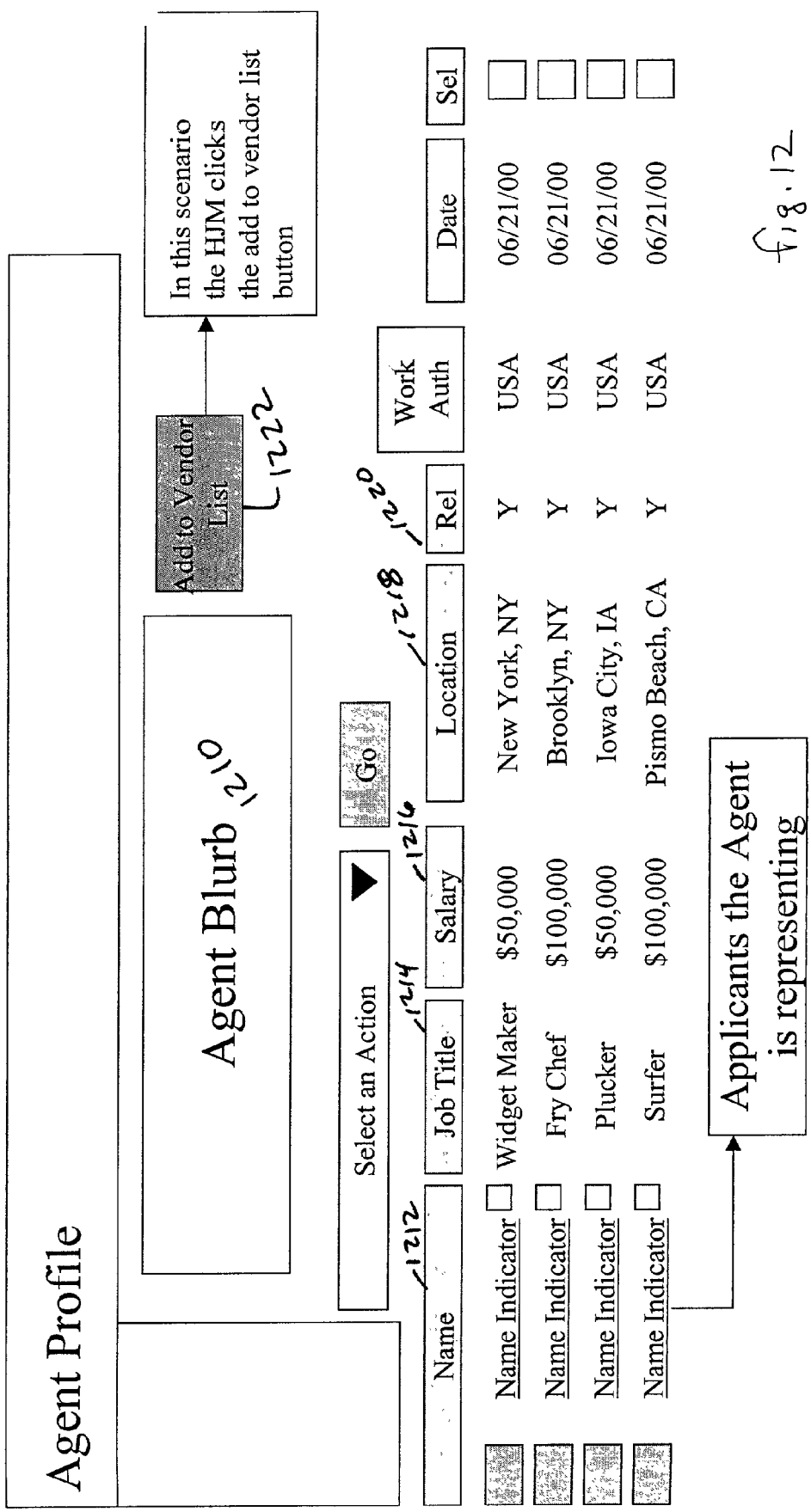
FIG. 12 illustrates the agent search results pages showing the placements of a specific agent and additional information on the agent.

Referring to FIG. 12, an Agent profile is illustrated. In this screen, some general information about the agent is displayed 1210. In addition, the names or other identifiers of the candidates being represented by the agent are shown 1212. Information concerning the job titles of the candidates 1214, their salaries desired 1216, where the candidates are located 1220, and whether the candidates are willing to relocate 1220. If the CM likes the information, candidates and Agency, the CM can add the agent to the CM's preferred vender list by so designating 1222 on this screen. From this point on, a communications link is established allowing the agent to submit resumes to the CM.

Figure 13:
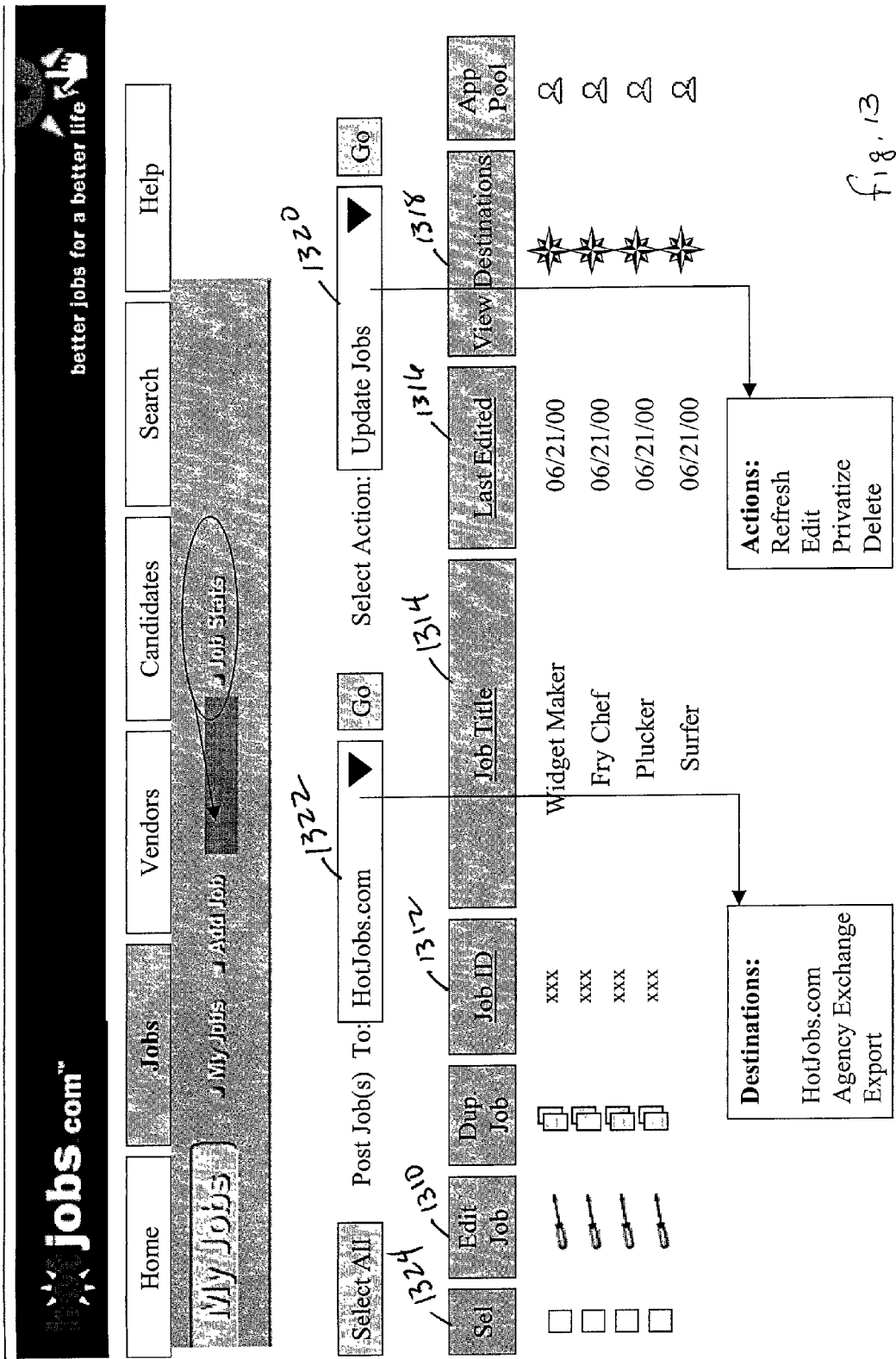
FIG. 13 illustrates a job page whereby a company can manage jobs that are required to be filled.

Referring to FIG. 13, the CM's job management function screen is illustrated. Any job of the CM can be edited 1310 by selecting the job 1324 and performing the editing task when the job description pops up. Each job is given an ID 1312 by the CM and a job title 1314 which aids in the search function. On the screen, the CM is shown th date of last edit of the job in question. The CM can also see to which vendor(s) the job had been sent 1318. The CM can control where the job is to be posted (i.e. the CBB, the C/PAS, or exported to another system). The job can also be refreshed, edited, deleted or made private for a period of time by the CM and to allowed to be searched.

Referring to FIG. 14, the results of resumes submitted tot eh CM is illustrated. In this results screen, the names of candidates submitted by agent(s) to the CM are shown 1410 along with their respective job titles 1412, their desired salaries 1414, their locations 1418 and whether they are willing to relocate 1420. The CM transfer any of the identified candidates to a variety of folders for subsequent management by the CM 1422.

A system and method for Agency recruiting and interaction with corporate recruiters has now been illustrated. It will be appreciated by those skilled in the art that other variations of the present invention are possible without departing from the scope of the invention as disclosed.

I claim:

1. A method comprising:
   providing a job board accessible to a plurality of placement agents and a recruiter via the Internet, said job board hosted by a server computing device on a network;

storing a placement agent profile in a database server on the network for each of said plurality of placement agents of the job board based on input from each of said placement agents;

storing a recruiter profile in the database server for said recruiter of the job board based on input from said recruiter;

receiving information on the job board regarding a plurality of job candidates and a plurality of available positions;

facilitating, via the job board, recruiter access to the stored placement agent profiles and placement agents access to the stored recruiter profile; and facilitating, via the job board, communication of information between a single selected placement agent and the recruiter regarding an available position and regarding a job candidate, by first establishing a first communication link via the job board from the recruiter associated with a computing device to the selected placement agent, said first communication link being established based upon permission being granted by said recruiter to said selected placement agent to conduct said communication for selective receipt by said recruiter of said information from said selected placement agent, and subsequently establishing a second communication link via the job board from the recruiter to the selected placement agent for transmitting the information regarding an available position from a database of stored available positions established by the recruiter directly to the selected placement agent, and a third communication link via the job board from the selected placement agent to the recruiter for transmitting information directly to the recruiter regarding a job candidate from a database of stored job candidate information established by the selected placement agent, in response to information transmitted via the second communication link.

2. A method according to claim 1, further comprising the steps of establishing a database having the profiles for the plurality of placement agents, the database being searchable by the recruiter, and establishing a rating for each placement agent in accordance with service performed by said placement agent, the rating input by the recruiter and included in the database.

3. A method according to claim 2, wherein the database is sortable in accordance with the rating and information in the placement agent profile.

4. A method according to claim 3, wherein the information in the placement agent profile includes at least one of an area of expertise, an industry focus, and a SIC code of the placement agent.

5. A method according to claim 1, further comprising the step of establishing a file for the information regarding available positions, the file being associated with a specific company recruiter.

6. A method according to claim 5, wherein the information regarding an available position is communicated in accordance with the profile of the selected placement agent.

7. A method according to claim 1, further comprising the steps of:

storing a candidate profile for a job candidate of the job board based on input from said job candidate; and extracting information from the information received on the job board regarding the job candidate; and establishing a file for the extracted information, so that the information regarding the job candidate includes (1) a resume and (2) the extracted information in said file.

8. A method according to claim 1, wherein said first communication link is established between the company recruiter and the selected placement agent in accordance with a determination by the company recruiter based on the profile for said placement agent.

9. A method according to claim 7, further comprising the step of establishing a file associated with each placement agent, wherein said file includes job candidate profiles and resumes.

10. A method according to claim 9, further comprising the step of using a knowledge-based system to perform said extracting, review posted resumes, and populate each job candidate profile with the extracted information.

11. A method according to claim 9, wherein at least one keyword input by a placement agent is associated with a job candidate profile.

12. A method comprising:

accepting, over a network, a placement agent profile for each of a plurality of placement agents, each of said profiles comprising input from one of said placement agent, each of said plurality of placement agents being associated with a computing device;

accepting a recruiter profile for a company recruiter, said recruiter profile comprising input from said company recruiter, said company recruiter being associated with a computing device;

accepting communication by said company recruiter regarding an available position to a bulletin board; and facilitating communication between a single placement agent selected by the company recruiter in accordance with the placement agent profiles and the company recruiter regarding said available position, by first establishing a first communication link via the bulletin board from the recruiter to the selected placement agent associated with a computing device, said first communication link being established based upon permission being granted by said recruiter to said selected placement agent to conduct said communication, and subsequently establishing a second communication link via the bulletin board from the recruiter to the selected placement agent for transmitting information regarding said available position to the selected placement agent.

* * * * *